(12) United States Patent
Kubo

(10) Patent No.: US 11,221,760 B2
(45) Date of Patent: Jan. 11, 2022

(54) INFORMATION PROCESSING APPARATUS, INFORMATION PROCESSING METHOD, AND STORAGE MEDIUM

(71) Applicant: Naohiko Kubo, Kanagawa (JP)

(72) Inventor: Naohiko Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 22 days.

(21) Appl. No.: 16/877,884

(22) Filed: May 19, 2020

(65) Prior Publication Data

US 2020/0379642 A1 Dec. 3, 2020

(30) Foreign Application Priority Data

May 31, 2019 (JP) .............................. JP2019-103121

(51) Int. Cl.

| | | |
|---|---|---|
| *G06F 3/0488* | (2013.01) | |
| *H04L 29/06* | (2006.01) | |
| *G06F 3/0484* | (2013.01) | |
| *G06F 3/0486* | (2013.01) | |
| *H04L 12/18* | (2006.01) | |

(52) U.S. Cl.
CPC ........ *G06F 3/04886* (2013.01); *G06F 3/0486* (2013.01); *G06F 3/04842* (2013.01); *H04L 12/1818* (2013.01); *H04L 65/403* (2013.01)

(58) Field of Classification Search
CPC .............. G06F 3/04886; G06F 3/0486; G06F 2203/04803; H04L 65/403
See application file for complete search history.

(56) References Cited

U.S. PATENT DOCUMENTS

| | | | | |
|---|---|---|---|---|
| 2015/0149930 A1* | 5/2015 | Walkin | ................ | G06F 3/04883 715/753 |
| 2015/0365306 A1* | 12/2015 | Chaudhri | .............. | G06F 3/0484 715/736 |
| 2016/0357357 A1* | 12/2016 | Lemay | ................... | G06F 3/0482 |
| 2017/0242538 A1* | 8/2017 | Chaudhri | .............. | G06F 3/0481 |
| 2018/0284948 A1* | 10/2018 | Hao | ....................... | G06F 3/0481 |
| 2018/0329521 A1* | 11/2018 | Hesketh | ................ | H04N 7/142 |
| 2018/0329550 A1* | 11/2018 | Dellinger | ............ | G06F 3/04886 |
| 2018/0356934 A1* | 12/2018 | Imanishi | ................ | G09G 5/003 |
| 2019/0303880 A1 | 10/2019 | Hashimoto et al. | | |

FOREIGN PATENT DOCUMENTS

JP       2006-146415       6/2006

* cited by examiner

*Primary Examiner* — Mong-Shune Chung
(74) *Attorney, Agent, or Firm* — IPUSA, PLLC

(57) ABSTRACT

An information processing apparatus includes circuitry configured to display, on a display, a first display area used for displaying an image shared with a plurality of devices as a shared image, and a second display area used for receiving a user input; and switch a display mode of the shared image based on a user operation of changing a display style of the second display area.

12 Claims, 18 Drawing Sheets

| FIG. 7A |
| FIG. 7B |

INFORMATION PROCESSING APPARATUS, INFORMATION PROCESSING METHOD, AND STORAGE MEDIUM

CROSS-REFERENCE TO RELATED APPLICATION

This application claims priority pursuant to 35 U.S.C. § 119(a) to Japanese Patent Application No. 2019-103121, filed on May 31, 2019 in the Japan Patent Office, the disclosure of which is incorporated by reference herein in its entirety.

BACKGROUND

Technical Field

This disclosure relates to an information processing apparatus, an information processing method, an information processing system, and a storage medium.

Background Art

Conference support or assistance systems integrate various sub-systems that perform various functions, such as video-voice recording-playback function, information board function, and personal memorandum function to support conferences or meetings, store or control various contents or data created by each sub-system by associating various contents or data with each conference or meeting, and refer to and utilize the stored contents or data.

Conventionally, images such as shared images that are shared among a plurality of users can be displayed on an information processing apparatus, such as notebook personal computer (PC) or tablet terminal, in which the plurality of users can input memorandum using the information processing apparatus. When inputting the memorandum using the information processing apparatus during the conference, the shared images being displayed on the information processing apparatus may obstruct an input operation performed by each user.

SUMMARY

As one aspect of the present disclosure, an information processing apparatus is devised. The information processing apparatus includes circuitry configured to display, on a display, a first display area used for displaying an image shared with a plurality of devices as a shared image, and a second display area used for receiving a user input; and switch a display mode of the shared image based on a user operation of changing a display style of the second display area.

As another aspect of the present disclosure, a method of processing information is devised. The method includes displaying, on a display, a first display area used for displaying an image shared with a plurality of devices as a shared image, and a second display area used for receiving a user input; and switching a display mode of the shared image based on a user operation of changing a display style of the second display area.

As another aspect of the present disclosure, a non-transitory computer readable storage medium storing one or more instructions that, when performed by one or more processors, causes the one or more processors to execute a method of processing information is devised. The method includes displaying, on a display, a first display area used for displaying an image shared with a plurality of devices as a shared image, and a second display area used for receiving a user input; and switching a display mode of the shared image based on a user operation of changing a display style of the second display area.

BRIEF DESCRIPTION OF THE DRAWINGS

A more complete appreciation of the description and many of the attendant advantages and features thereof can be readily acquired and understood from the following detailed description with reference to the accompanying drawings, wherein.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the term's "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description of given of an embodiment in detail with reference to the drawings. This disclosure describes an information sharing system for use in conference, and the information sharing system can use a shared board and one or more personal boards, but is not limited thereto. For example, the information processing system can be applied to various situations, such as seminars, lectures, or the like. Further, this disclosure describes a remote conference or teleconference that is performed by users present at remote locations connected via a network, but is not limited thereto. For example, the information sharing system can be applied to a situation that all users are present in the same room. Therefore, the users may not need to be physically separated from each other.

First Embodiment

Information Sharing System Used for Conference

Figure 1:
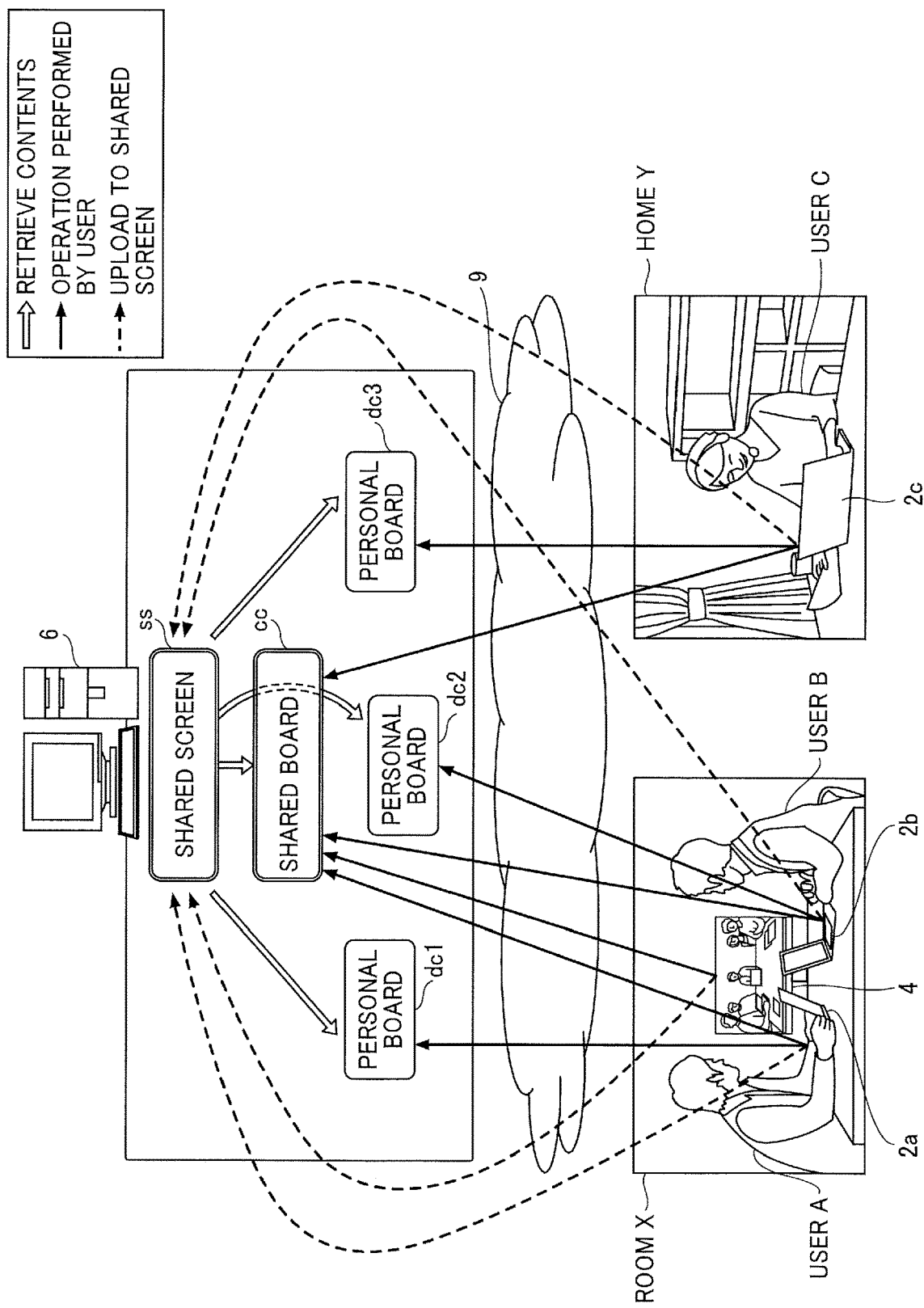
FIG. 1 is a schematic configuration of an information sharing system used for a conference, according to an embodiment of this disclosure.

Hereinafter, a description is given of an information sharing system used for a conference with reference to FIG. 1. FIG. 1 is a schematic configuration of the information sharing system used for a conference. FIG. 1 illustrates an example case that users A and B, present in a conference room X of a company, and user C, present in a home Y, perform a teleconference using the information sharing system.

In the conference room X, the user A brings and uses a personal terminal 2a (first personal terminal), and the user B brings and uses a personal terminal 2b (second personal terminal). Further, a common terminal 4 that can be used and shared by a plurality of users can be disposed in the conference room X. Since the common terminal 4 is not an essential terminal, the common terminal 4 can be omitted in some situations. Further, the user C uses a personal terminal 2c (third personal terminal) at home Y of the user C.

FIG. 1 illustrates an example case that the personal terminals 2a and 2b, and the personal terminal 2c are located in different locations, but is not limited thereto. The personal terminals 2a, 2b, and 2c are not required to be present at different locations, but the personal terminals 2a, 2b, and 2c can be present in the same location. Hereinafter, the personal terminal 2a, 2b, and 2c may be collectively referred to as the "personal terminal 2."

The personal terminal 2 is a computer that each user can use as a dedicated personal computer, and each user can view, see or refer to a screen of the personal terminal 2.

Further, the common terminal 4 is a computer that is shared and used by a plurality of users, and the plurality of users can view, see or refer to a screen of the common terminal 4.

The personal terminal 2 includes, for example, personal computer (PC), desktop PC, portable phone, smartphone, tablet terminal, wearable PC, or the like. In this disclosure, the personal terminal 2 is an example of communication terminal or information processing apparatus.

The common terminal 4 includes, for example, projector (PJ), interactive white board (IWB), digital signage, and display connected with stick PC, or the like. The IWB is a white board having electronic information board function that can communicate with other terminals. In this disclosure, the common terminal 4 is an example of communication terminal or information processing apparatus.

The personal terminal 2 and the common terminal 4 can communicate with a content management server 6 via a communication network 9, such as the Internet. The communication network 9 may be one or more local area networks (LAN) disposed inside a firewall, or may include the Internet outside of the firewall in addition to the LAN. Further, the communication network 9 may include virtual private network (VPN) and wide-area Ethernet (registered trademark). The communication network 9 may be configured either wired network or wireless network, or may be a combination of wired network and wireless networks. Further, if the terminals and server are connected by a mobile phone network such as 3G, Long Term Evolution (LTE), or 4G, the LAN can be omitted.

The content management server 6 is a computer, such as a web server or an hypertext transfer protocol (HTTP) server, which stores and manages/controls data of contents to be transmitted to the personal terminal 2 and the common terminal 4. The content management server 6 includes, for example, a storage unit 6000, to be described later.

The storage unit 6000 configures a storage position or storage area for implementing each of personal boards "dc1," "dc2," and "dc3" accessible only from the respective personal terminals 2a, 2b, and 2c. Each of the personal boards "dc1," "dc2," and "dc3" is accessible only from the respective personal terminals 2a, 2b, and 2c. Hereinafter, the personal boards "dc1," "dc2," and "dc3" may be collectively referred to as the personal board "dc." Further, the content management server 6 may be cloud computing. The cloud computing is a use of computing resources disposed on a network without awareness of specific hardware resources.

Further, the storage unit 6000 of the content management server 6 configures a storage position or storage area for implementing a shared board "cc," which can be accessed from each personal terminal 2. Further, the storage unit 6000 of the content management server 6 configures a storage position or storage area for implementing a shared screen "ss," which is accessible from each personal terminal 2.

The personal board "dc" and the shared board "cc" are virtual spaces (e.g., digital spaces) that are created in the storage position or storage area of the storage unit 6000 of the content management server 6. The personal board "dc" and the shared board "cc" can be accessed using a web application including functions of viewing and editing contents using Canvas element and JavaScript (registered trademark), or the like. The web application can be executed by cooperating a program created by script language (e.g., JavaScript) that can run on a web browser application (hereinafter, web browser) and a program stored in a web server, and the web application indicates software or an software configuration used on the web browser.

Each of the personal board "dc" and the shared board "cc" is configured using a given size region within resource capacities of the storage area of the storage unit 6000. For example, each of the personal board "dc" and the shared board "cc" can be configured with a given size region within the resource capacities of the storage area of the storage unit 6000 in both of vertical and lateral directions, or can be configured with a given size region within the resource capacities of the storage area of the storage unit 6000 in any one of the vertical and lateral directions.

Further, the shared screen "ss" is a virtual space (e.g., digital space) that is created in the storage position or storage area of the storage unit 6000 of the content management server 6. Different from the personal board "dc" and the shared board "cc," the shared screen "ss" retains data of contents to be transmitted or distributed to the personal terminal 2 and the common terminal 4, and has a function of retaining the current content until acquiring the next content. The shared screen "ss" can be accessed using a web application that has a function of browsing the contents.

Further, the personal board "dc" is an electronic space (e.g., digital space) dedicated for each user participating in a teleconference. The personal terminal 2 of each user can exclusively access the personal board "dc" exclusively set for each user, and the user can use the personal terminal 2 to view and edit (e.g., inputting, deleting, copying) contents such as characters and images.

The shared board "cc" is an electronic space (e.g., digital space) that is shared by each user participating in a particular teleconference. The personal terminal 2 used by each user can access the shared board "cc," and the personal terminal 2 used by each user can be used to view and edit (e.g., inputting, deleting, copying) contents such as characters and images.

Further, the shared screen "ss" is an electronic space (e.g., digital space) that is shared by each user participating in the teleconference. The personal terminal 2 of each user can access the shared screen "ss," and can be used to view the shared screen "ss." Different from the personal board "dc" and the shared board "cc," the shared screen "ss" retains data of contents to be transmitted or distributed to the personal terminal 2 and the common terminal 4, and has a function of retaining the current content until acquiring the next content.

For example, when one content data is transmitted to the shared screen "ss" from the personal terminal 2a, and then another content data is transmitted to the shared screen "ss" from the personal terminal 2b, the one content data retained by the shared screen "ss" is changed to another content data transmitted from the personal terminal 2b, which is the content data received the most recently by the shared screen "ss." For example, a computer screen, such as an application screen shared and used by each user, is displayed on the shared screen "ss."

The content management server 6 manages or controls information, such as contents to be loaded to the shared screen "ss," the shared board "cc," and the personal board "dc" in association with each virtual conference room (hereinafter, referred to as "room"), which is an example of virtual room. With this configuration, even if the content management server 6 manages or controls the content data of a plurality of rooms, communication of the content data between different rooms is not performed.

Since the personal terminal 2 used by each user installed with the web application of the web browser, the personal terminal 2 used by each user can display the contents of the personal board "dc," the contents of the shared board "cc" and the contents the shared screen "ss" of each room where the each user has participated, with which a teleconference (virtual conference) closer to an actual conference room (face-to-face conference in actual room) can be performed.

With employing the above described information sharing system, each user can open personal files using applications and share the personal files on the shared screen "ss," each user can share handwriting and object arrangement on the shared board "cc," each user can import contents shared on the shared screen "ss" to the personal board "dc" as personal reference materials, and each user can use and retain handwriting, object arrangement, or the like as personal memorandum on the personal board "dc." Further, the information sharing system is not required to include all of the shared screen "ss," the shared board "cc" and the personal board "dc." For example, the information sharing system can be configured to include the shared screen "ss" and the shared board "cc" alone, or the shared screen "ss" and the personal board "dc" alone.

Personal Portal Screen in Information Sharing System

Figure 2:
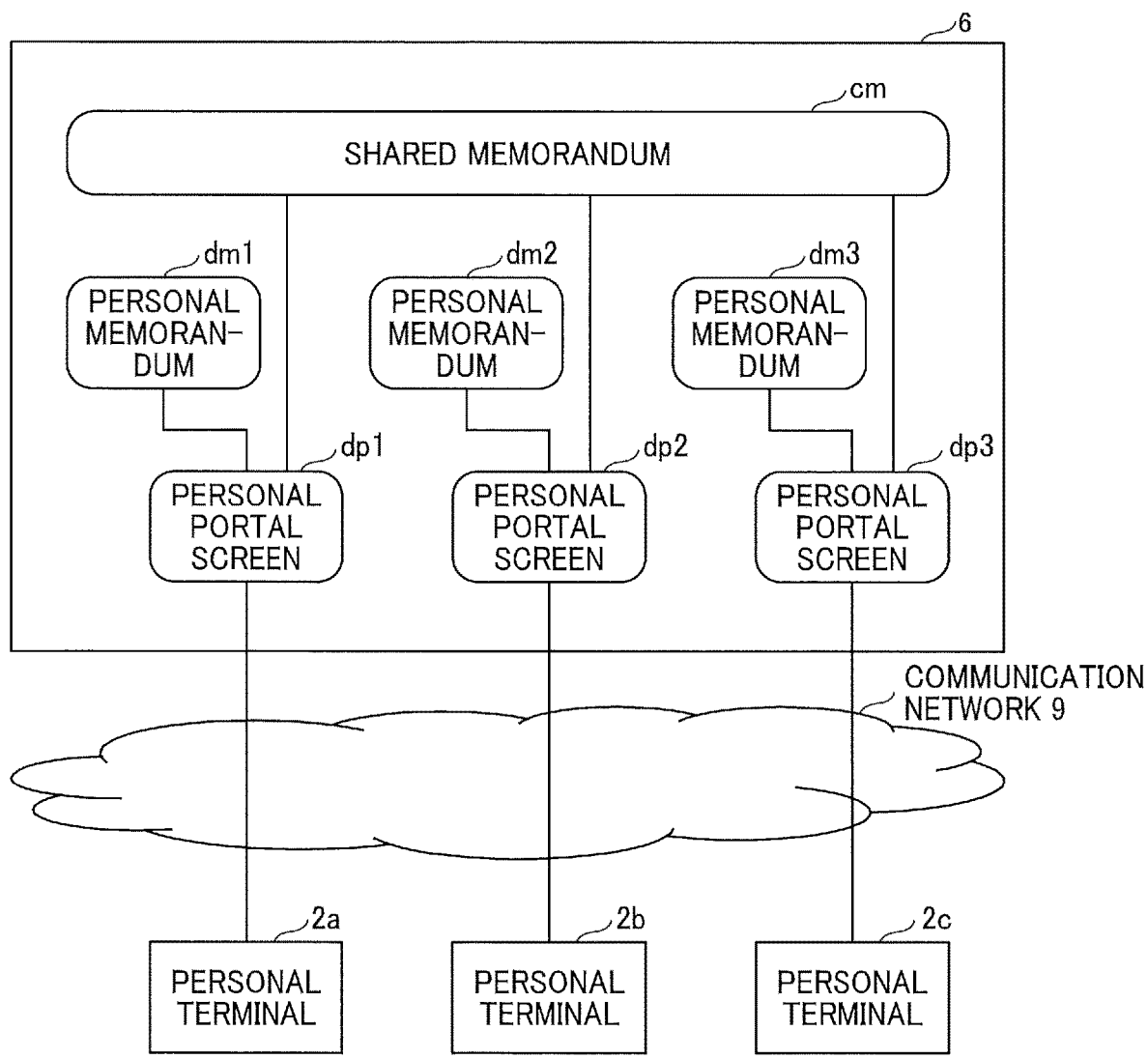
FIG. 2 is a schematic diagram of a personal portal screen configured in the information sharing system of FIG. 1.

Hereinafter, a description is given of a personal portal screen with reference to FIG. 2. FIG. 2 is a schematic diagram of the personal portal screen configured in the information sharing system. The content management server 6 generates data for personal portal screens "dp1," "dp2," and "dp3" dedicated for each personal terminal 2, and displays the personal portal screens "dp1," "dp2," and "dp3" on each personal terminal 2. Hereinafter, the personal portal screens "dp1," "dp2," and "dp3" may be collectively referred to as the personal portal screen "dp."

The content management server 6 stores and manages or controls shared memorandum "cm" that was edited on the shared board "cc" (FIG. 1) during the conference, and personal memorandum "dm1," dm2," and "dm3" that was edited on the personal board "dc" during the conference. Hereinafter, the personal memorandum "dm1," dm2," and "dm3" may be collectively referred to as the personal memorandum "dm." When each user accesses the personal portal screen "dp" dedicated for the personal terminal 2 used by each user, the personal portal screen "dp" displays a conference list including one or more conferences to which each user who operates the personal terminal 2 has participated.

Each user can view the shared memorandum "cm," the personal memorandum "dm" and bibliographic information of each conference, from the conference list displayed on the personal portal screen "dp," to be described later. Therefore, each user can use the personal terminal 2 to easily display the shared memorandum "cm," the personal memorandum "dm" and the bibliographic information of the desired conference when the user wants to recall or reflect the contents of the desired conference.

Further, by accessing the personal portal screen "dp" exclusively configured for each of the personal terminal 2, each user can search the desired conference based on a keyword search (text search) from the conference list that is displayed on the personal terminal 2 that the user operates. When the text search is performed, the search target includes, for example, bibliographic information of conference, text data and handwritten characters included in the personal memorandum "dm," and conference evaluation comment by user. The bibliographic information of conference is included in conference information.

Hardware Configuration of Content Management Server

Figure 3:
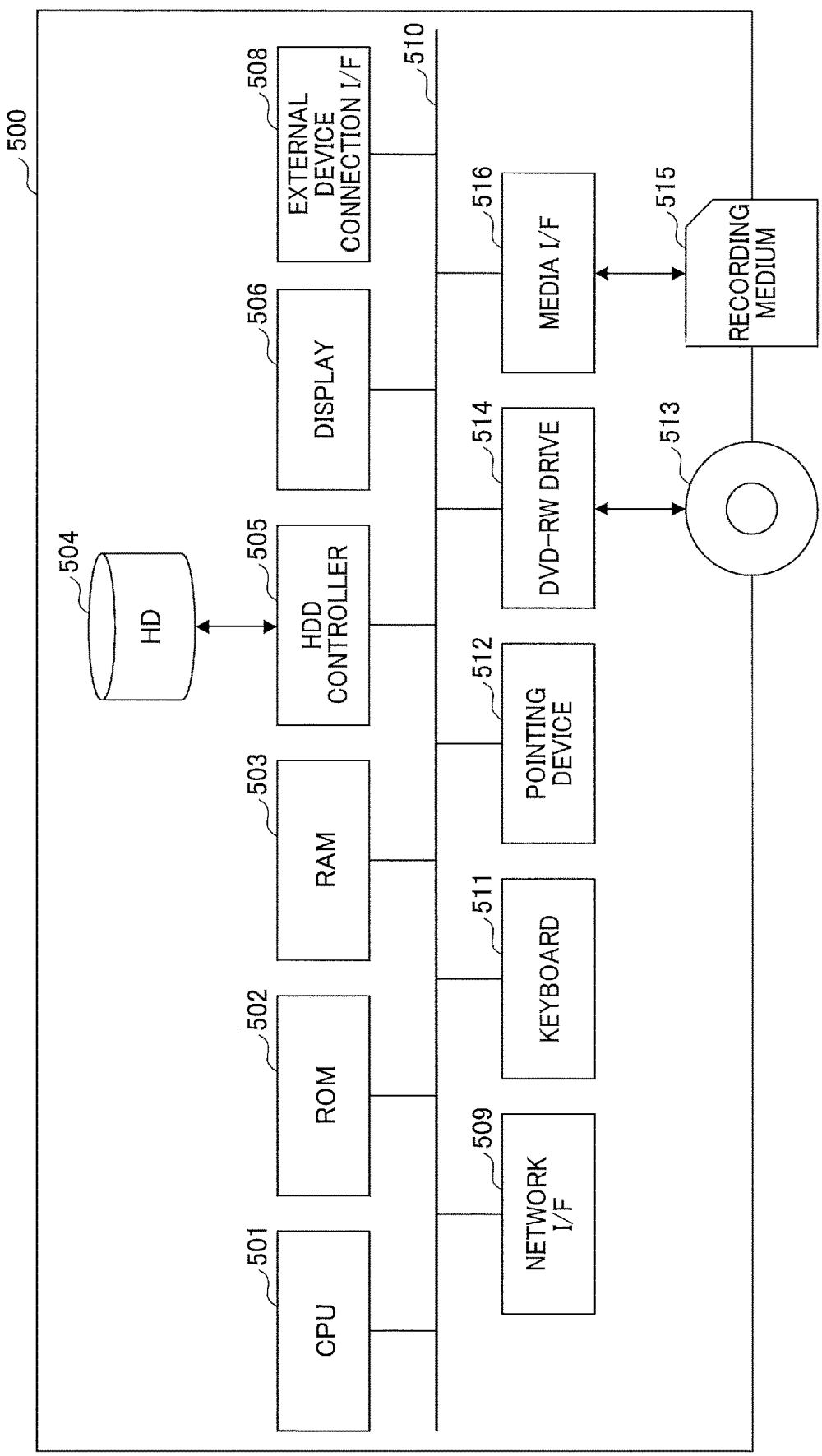
FIG. 3 is an example of hardware block diagram of a computer according to an embodiment of this disclosure.

The content management server 6 is implemented, for example, by a computer 500 employing a hardware configuration illustrated in FIG. 3. Further, the personal terminal 2 (information processing apparatus) is also implemented, for example, by the computer 500 employing the hardware configuration illustrated in FIG. 3.

FIG. 3 is an example of a hardware block diagram of the computer 500 according to the embodiment. As illustrated in FIG. 3, the computer 500 includes, for example, a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network interface (I/F) 509, a data bus 510, a keyboard 511, a pointing device 512, a digital versatile disk rewritable (DVD-RW) drive 514, and a media interface (I/F) 516.

The CPU 501 controls the operation of the computer 500 entirely. The ROM 502 stores programs used for driving the CPU 501, such as initial program loader (IPL). The RAM 503 is used as a work area of the CPU 501. The HD 504 stores various data, such as programs. The HDD controller 505 controls reading and writing of various data with the HD 504 under the control of the CPU 501.

The display 506 displays various information such as cursor, menus, windows, characters, or images. The external device connection I/F 508 is an interface for connecting various external devices. In this case, the external device is, for example, a universal serial bus (USB) memory, a printer, or the like. The network I/F 509 is an interface for performing data communication by utilizing the communication network 9. The data bus 510 is an address bus and a data bus used for electrically connecting each of the components, such as the CPU 501, illustrated in FIG. 3.

The keyboard 511 is a type of input unit having a plurality of keys used for inputting characters, numerals, various instructions, or the like. The pointing device 512 is a type of input unit used for selecting and executing various instructions, selecting a process target, moving a cursor, or the like. The DVD-RW drive 514 controls reading and writing of various data with the DVD-RW 513 used as an example of removable recording media. The computer may include digital versatile disk recordable (DVD-R) in addition to or instead of DVD-RW. The media I/F 516 controls reading and writing (storing) of data with a recording medium 515, such as flash memory.

Hardware Configuration of Smart Phone

Figure 4:
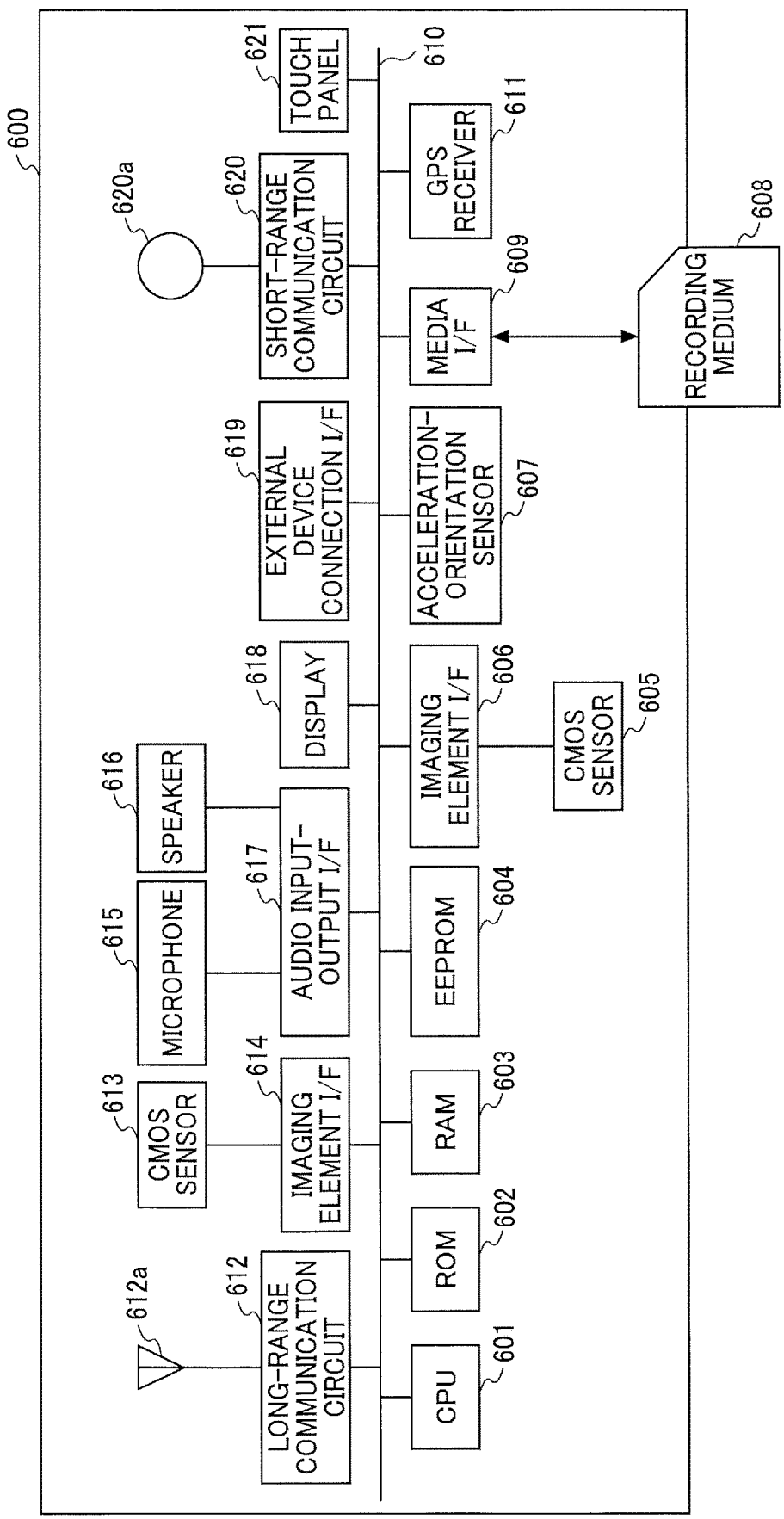
FIG. 4 is an example of hardware block diagram of a smart phone according to an embodiment of this disclosure.

The personal terminal 2, which is an example of the information processing apparatus, may be implemented, for example, by a smart phone 600 employing a hardware configuration illustrated in FIG. 4.

FIG. 4 is an example of hardware block diagram of the smart phone 600 according to the embodiment. As illustrated in FIG. 4, the smart phone 600 includes, for example, a CPU 601, a ROM 602, a RAM 603, an electrically erasable programmable read-only memory (EEPROM) 604, a complementary metal oxide semiconductor (CMOS) sensor 605, an imaging element interface (I/F) 606, an acceleration-orientation sensor 607, a media I/F 609, and a global positioning system (GPS) receiver 611.

The CPU 601 controls the operation of the smart phone 600 entirely. The ROM 602 stores programs used for driving the CPU 601, such as initial program loader (IPL). The RAM 603 is used as a work area of the CPU 601 of the smart phone 600. Under the control of the CPU 601, the EEPROM 604 reads or writes various data, such as a program for smart phone.

The CMOS sensor 605 is a type of built-in imaging unit that captures images of objects, such as image of user, and acquires image data under the control of the CPU 601. Further, a charge coupled device (CCD) sensor may be used as an imaging unit for the smart phone 600 instead of the CMOS sensor. The imaging element I/F 606 is a circuit that controls the driving of the CMOS sensor 605. The acceleration-orientation sensor 607 includes, for example, various sensors, such as an electronic magnetic compass to detect geomagnetism, a gyrocompass, and an acceleration sensor.

The media I/F 609 controls reading and writing (storing) of data to a recording medium 608, such as flash memory. The GPS receiver 611 receives GPS signals from GPS satellites.

The smart phone 600 further includes, for example, a long-range communication circuit 612, a CMOS sensor 613, an imaging element interface (I/F) 614, a microphone 615, a speaker 616, an audio input-output interface (I/F) 617, a display 618, an external device connection interface (I/F) 619, a short-range communication circuit 620, an antenna 620a of the short-range communication circuit 620, and a touch panel 621.

The long-range communication circuit 612 is a circuit that communicates with another device via a communication network. The CMOS sensor 613 is a type of built-in imaging unit for capturing images of objects and acquiring image data under the control of CPU 601. The imaging element I/F 614 is a circuit that controls the driving of the CMOS sensor 613. The microphone 615 is a type of built-in circuit that converts audio signals into electrical signals. The speaker 616 is a type of built-in circuit that converts electrical signals into physical vibration to generate audio, such as music and voice.

The audio input-output I/F 617 is a circuit that processes input and output of the audio signals with the microphone 615 and the speaker 616 under the control of the CPU 601. The display 618 is a type of display unit, such as liquid crystal and organic electro luminescence (OEL), which displays images of objects and various icons, or the like.

The external device connection I/F 619 is an interface for connecting various external devices. The short-range near-field communication circuit 620 is a communication circuit, such as near field communication (NFC) and Bluetooth (registered trademark). The touch panel 621 is a type of input unit for operating the smart phone 600 used by a user by pressing the display 618.

The smart phone 600 further includes, for example, a bus line 610. The bus line 610 is an address bus and a data bus used for electrically connecting each of the components, such as the CPU 401 illustrated in FIG. 4.

Hardware Configuration of Projector

Figure 5:
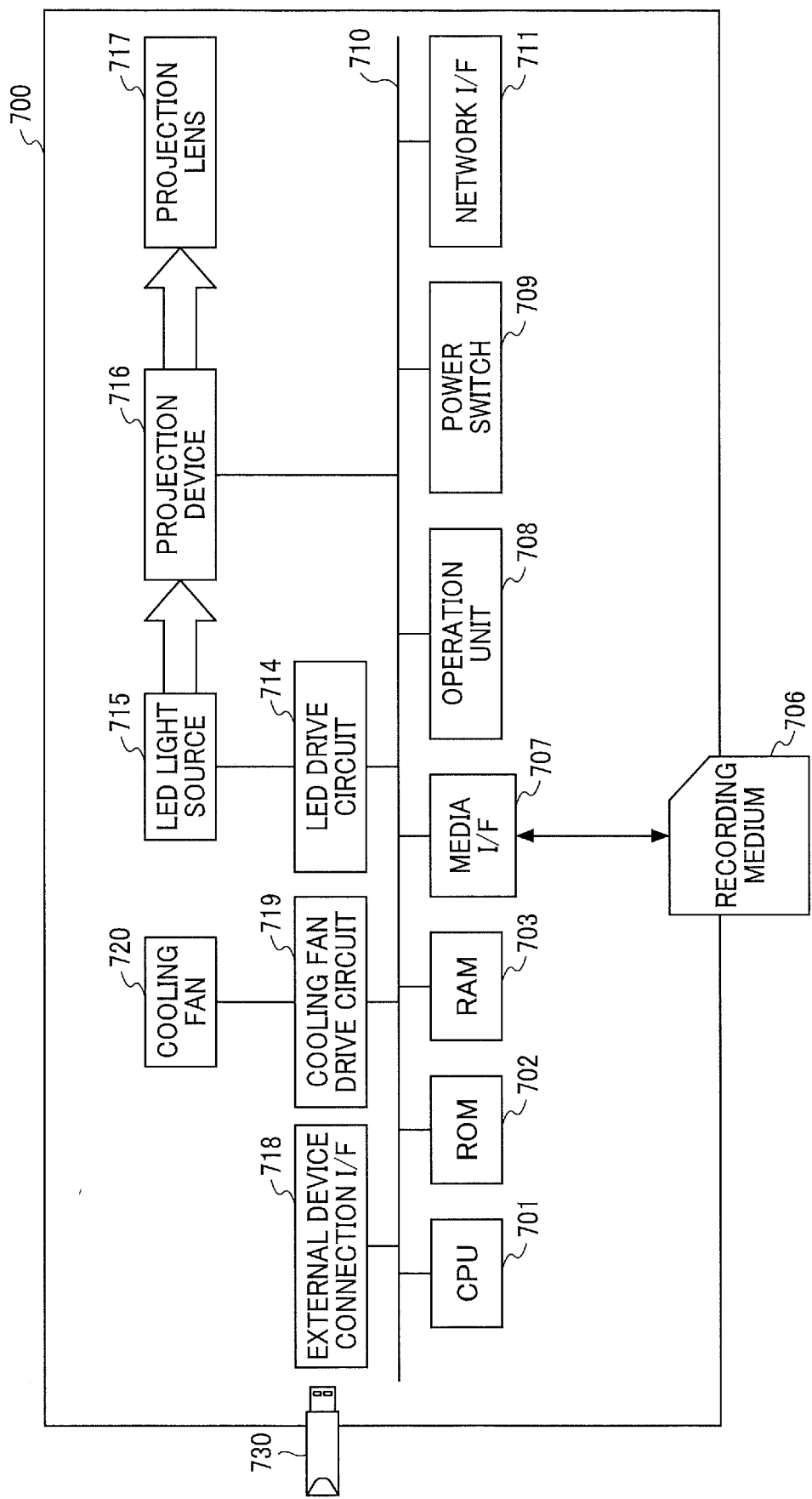
FIG. 5 is an example of hardware block diagram of a projector according to an embodiment of this disclosure.

A projector 700, which is an example of the common terminal 4, may be implemented, for example, by employing a hardware configuration illustrated in FIG. 5.

FIG. 5 is an example of hardware block diagram of the projector 700 according to the embodiment. As illustrated in FIG. 5, the projector 700 includes, for example, a central processing unit (CPU) 701, a read only memory (ROM) 702, a random access memory (RAM) 703, a media interface (I/F) 707, an operation unit 708, a power switch 709, a bus line 710, a network interface (I/F) 711, a light emitting diode (LED) drive circuit 714, an LED light source 715, a projection device 716, a projection lens 717, an external device connection interface (I/F) 718, a cooling fan drive circuit 719, and a cooling fan 720.

The CPU 701 controls the operation of the projector 700 entirely. The ROM 702 stores programs used for driving the CPU 701. The RAM 703 is used as a work area of the CPU 701 of the projector 700. The media I/F 707 controls reading and writing (storing) of data to a recording medium 706, such as a flash memory.

The operation unit 708 is provided with various keys, buttons and LED. A user uses the operation unit 708 to perform various operations other than the power ON and OFF of the projector 700. For example, the operation unit 708 receives an instruction operation, such as an adjustment operation of the size of projection image, a color tone adjustment operation, a focus adjustment operation, and a keystone adjustment operation, and outputs the received operation contents to the CPU 701.

The power switch 709 is a switch for switching ON and OFF of the power supply of the projector 700. The bus line 710 is an address bus and a data bus used for electrically connecting each of the components, such as the CPU 701 illustrated in FIG. 5. The network I/F 711 is an interface for performing data communication using a communication network such as the Internet.

The LED drive circuit 714 controls the lighting and turning off of the LED light source 715 under the control of the CPU 701. When the LED light source 715 is lighted under the control of the LED drive circuit 714, the LED light source 715 irradiates projection light to the projection device 716.

The projection device 716 projects modulated light, acquired by modulating the projection light coming from the LED light source 715 by the spatial light modulation system, based on the image data provided by the external device connection I/F 718 as an image onto a projection surface, such as a screen through the projection lens 717. The projection device 716 uses, for example, a liquid crystal panel or digital micromirror device (DMD).

The LED drive circuit 714, the LED light source 715, the projection device 716 and the projection lens 717 can collectively function as a projection unit (projection means) used for projecting projection images onto the projection surface based on the image data.

The external device connection I/F 718 directly connects to a personal computer (PC) and acquires control signals and image data between from the PC. Further, the external device connection I/F 718 is an interface for connecting with various external devices, such as stick PC 730.

The cooling fan drive circuit 719 is connected to the CPU 701, and drives and stops the cooling fan 720 based on the control signals received from the CPU 701. The cooling fan 720 rotates to exhaust air inside the projector 700 to cool the interior of the projector 700.

Further, when the power is supplied, the CPU 701 starts in accordance with the control program stored in the ROM 702 in advance, and supplies control signals to the LED drive circuit 714 to turn on the LED light source 715. At the same time, the CPU 701 supplies control signals to the cooling fan drive circuit 719 to rotate the cooling fan 720 at a pre-set rated rotational speed.

Further, when the supply of power from a power supply circuit is started, the projector 700 sets the projection device 716 in an image display state, and the power supply circuit supplies power to other various components. Further, as to the projector 700, when the power switch 709 is turned OFF, the power switch 709 transmits a power OFF signal to the CPU 701.

When the CPU 701 detects the power OFF signal, the CPU 701 supplies control signals to the LED drive circuit 714 to turn off the LED light source 715. Then, after a pre-set period of time has elapsed, the CPU 701 supplies control signals to the cooling fan drive circuit 719 to stop the cooling fan 720. At the same time, the CPU 701 terminates the control processing of the CPU 701, and finally supplies an instruction to the power supply circuit to stop the power supply.

Hardware Configuration of IWB

Figure 6:
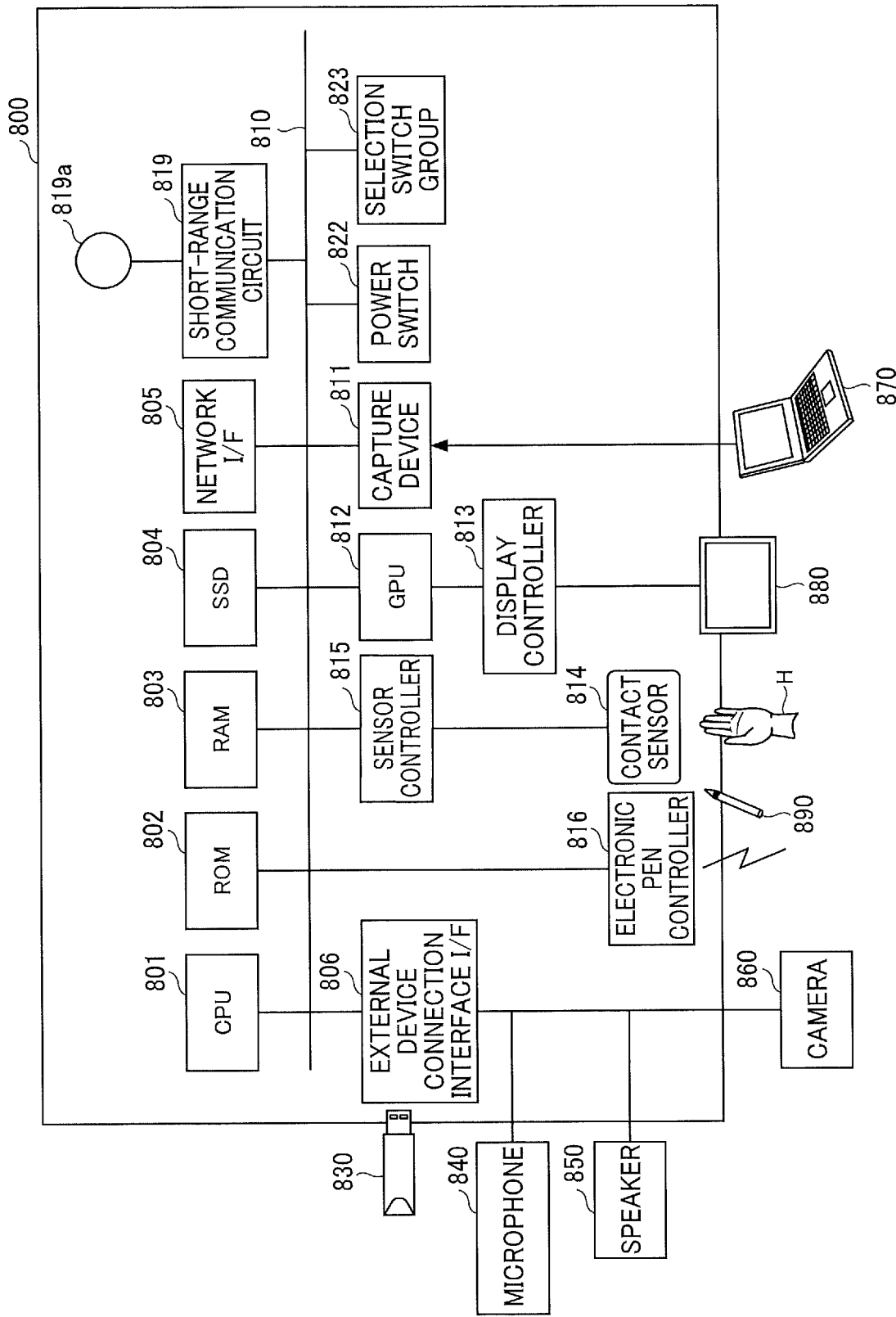
FIG. 6 is an example of hardware block diagram of an interactive white board (IWB) according to an embodiment of this disclosure.

An interactive white board (IWB) 800, which is an example of the common terminal 4, may be implemented, for example, by employing a hardware configuration illustrated in FIG. 6.

FIG. 6 is an example of hardware block diagram of the IWB 800 (electronic information board apparatus) according to the embodiment. As illustrated in FIG. 6, the IWB 800 includes, for example, a central processing unit (CPU) 801, a read only memory (ROM) 802, a random access memory (RAM) 803, a solid state drive (SSD) 804, a network interface (I/F) 805 and an external device connection interface (I/F) 806.

The CPU 801 controls the operation of the IWB 800 entirely. The ROM 802 stores programs used for driving the CPU 801, such as initial program loader (IPL). The RAM 803 is used as a work area of the CPU 801. The SSD 804 stores various data such as programs for the IWB 800. The network I/F 805 controls communication with the network 16. The external device connection I/F 806 is an interface for connecting various external devices. In this case, the external device is, for example, a universal serial bus (USB) memory 830, an externally-set device, such as a microphone 840, a speaker 850, a camera 860.

The IWB 800 further includes, for example, a capture device 811, a graphics processing unit (GPU) 812, a display controller 813, a contact sensor 814, a sensor controller 815, an electronic pen controller 816, a short-range communication circuit 819, an antenna 819a of the short-range communication circuit 819, and a power switch 822, and a selection switch group 823.

The capture device 811 displays image information on a display of an externally-connected personal computer (PC) 870 as still image or movie image. The GPU 812 is a semiconductor chip that processes graphics data. The display controller 813 controls and manages a screen display for outputting output images from the GPU 812 to a display 880.

The contact sensor 814 detects that an electronic pen 890 or a user hand H has contacted with the display 880. The sensor controller 815 controls the processing of the contact sensor 814. The contact sensor 814 performs an input of coordinates and detection of coordinates using the infrared ray blocking method. As to the method of inputting coordinates and detecting coordinates, two light emission-reception devices disposed at the upper end corners of the display 880 radiate infrared rays parallel to the display 880, and the infrared rays are reflected by reflective members disposed around the display 880, and then the two light emission-reception devices receive the light beams coming from the optical path, which is the optical path of the light emitted by the two light emission-reception device.

The contact sensor 814 outputs identification (ID) of the infrared ray emitted by the two light emission-reception devices and blocked by an object to the sensor controller 815. The sensor controller 815 identifies the coordinate position where the object contacts on the display 880. By communicating with the electronic pen 890, the electronic pen controller 816 determines whether or not a pen tip or pen end touches the display 880.

The short-range communication circuit 819 is a communication circuit, such as near field communication (NFC) and Bluetooth (registered trademark). The power switch 822 is a switch for switching ON-OFF of power supply to the IWB 800. The selection switch group 823 is, for example, a group of switches used for adjusting display brightness and colors of the display 880.

Further, the IWB 800 includes a bus line 810. The bus line 810 is an address bus and a data bus used for electrically connecting each of the components, such as the CPU 801, illustrated in FIG. 6.

The contact sensor 814 can use not only the infrared blocking system, but also various detection system, such as a touch panel of electrostatic capacitance type that identifies a contact position by detecting a change in capacitance, a touch panel of resistance film type that identifies a contact position based on a voltage change of two resistive films, and a touch panel of electromagnetic induction type that identifies a contact position by detecting the electromagnetic induction caused by a contact of an object on the touch panel. Further, the electronic pen controller 816 can determine whether a user grip portion of the electronic pen 890 or other portion of the electronic pen 890 touches the display 880 in addition to the pen tip and pent end of the electronic pen 890.

Functional Configuration

Figure 7A:
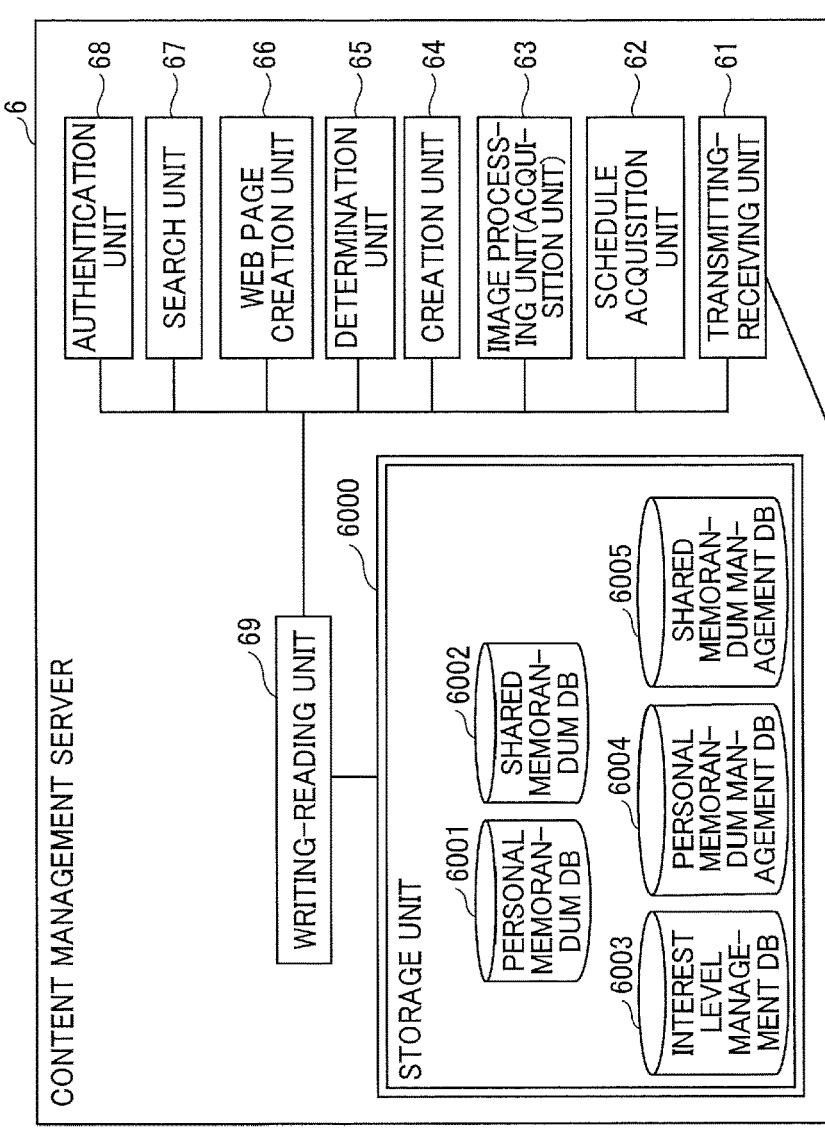
FIGS. 7A and 7B illustrate an example of functional block diagram of each terminal and server configuring the information sharing system according to an embodiment of this disclosure.

Hereinafter, a description is given of a functional configuration of each terminal and server configuring the information sharing system with reference to FIG. 7. FIGS. 7A and 7B illustrate an example of functional block diagram of each terminal and server configuring the information sharing system.

Functional Configuration of Personal Terminal

Hereinafter, a description is given of a functional configuration of the personal terminal 2a with reference to FIG. 7B. The personal terminals 2b and 2c also employs the functional configuration of FIG. 7B.

Figure 7B:
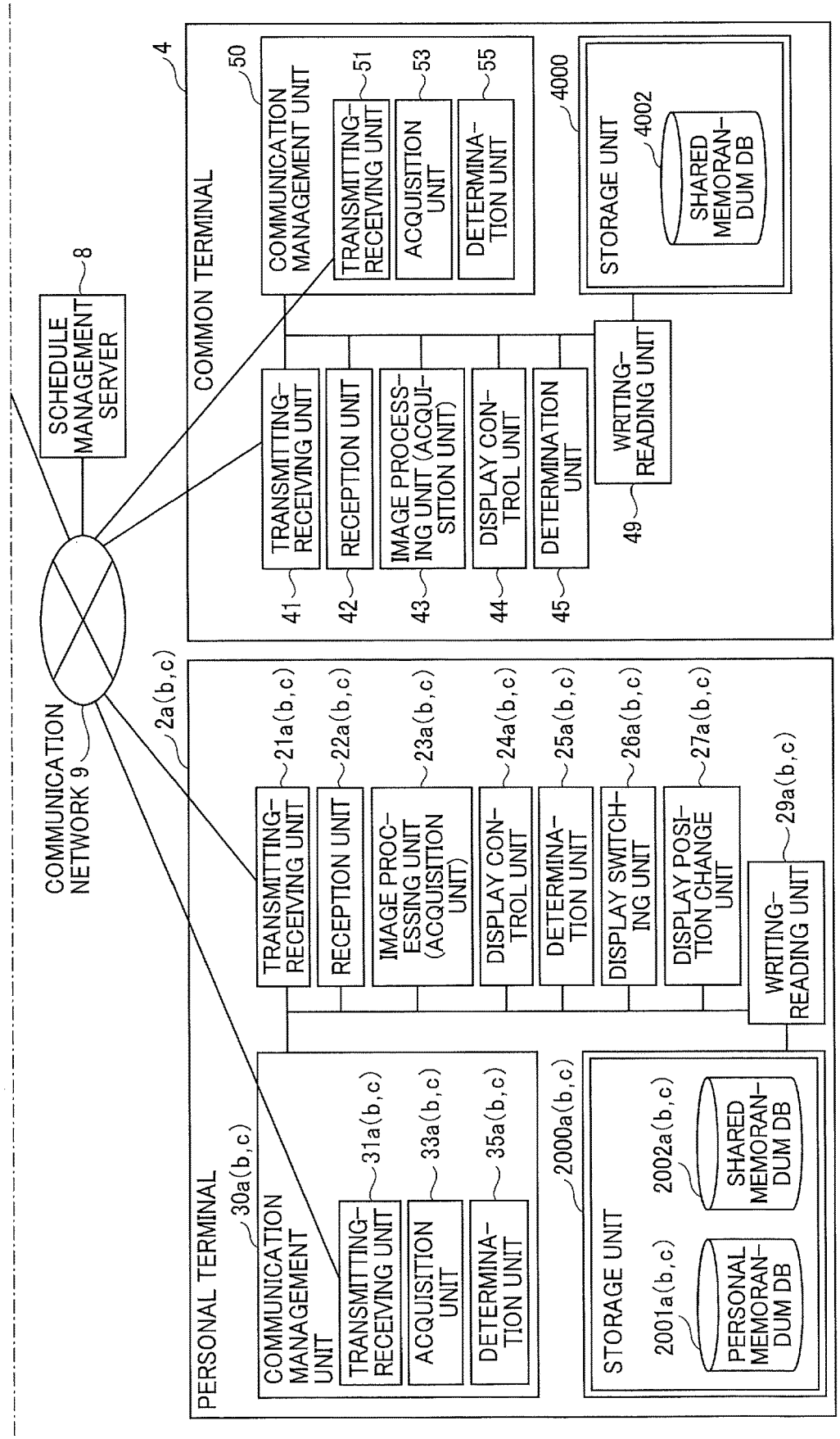

As illustrated in FIG. 7B, the personal terminal 2a includes, for example, a transmitting-receiving unit 21a, a reception unit 22a, an image processing unit 23a, a display control unit 24a, a determination unit 25a, a display switching unit 26a, a display position change unit 27a, a writing-reading unit 29a, and a communication management unit 30a. Each of these units is a function or functional unit that can be implemented when any of the components illustrated in FIG. 3 is operated under the instruction of the CPU 501 that executes programs loaded from the HD 504 on the RAM 503. Further, the personal terminal 2a includes, for example, a storage unit 2000a, implemented by the RAM 503 and the HD 504 illustrated in FIG. 3. Further, the storage unit 2000a includes, for example, a personal memorandum database (DB) 2001a, and a shared memorandum database (DB) 2002a.

Further, the transmitting-receiving unit 21a, the reception unit 22a, the image processing unit 23a, the display control unit 24a, the determination unit 25a, the display switching unit 26a, the display position change unit 27a and the writing-reading unit 29a can be implemented by a web application of web browser, which is used to display a personal board screen, to be described later. The communication management unit 30a is implemented by a dedicated communication application.

Hereinafter, a description is given of each functional unit of the personal terminal 2a. The transmitting-receiving unit 21a transmits and receives data or information with other terminal, device, or server via the communication network 9. For example, the transmitting-receiving unit 21a receives content data described by hypertext markup language (HTML), cascading style sheet (CSS), and JavaScript (registered trademark) from the content management server 6. Further, the transmitting-receiving unit 21a transmits information input by a user to the content management server 6.

The reception unit 22a receives various inputs from the keyboard 511 and the pointing device 512 operated by a user.

The image processing unit 23a performs various processing, such as creating vector data or stroke data based on a drawing operation performed by the user. Further, the image processing unit 23a has a function as an acquisition unit that acquires, for example, images captured by performing a capturing operation of the shared screen "ss" (hereinafter, acquired image or images).

The display control unit 24a instructs the display 506 to display the personal board screen and the shared board screen, to be described later. The determination unit 25a performs various determinations.

The display switching unit 26a performs various processing, such as switching to a picture-in-picture mode and a termination of picture-in-picture mode, to be described later, based on a user operation to at least any one of the personal board screen and the shared board screen.

When a particular image is switched to the picture-in-picture mode, the display position change unit 27a performs processing, such as moving a display position of the concerned particular image (floating image) to a position that does not obstruct an operation of inputting of memorandum, such as memorandum writing operation performed by a user hand. The controlling of picture-in-picture mode is performed by an operating system (hereinafter, referred to as OS).

The writing-reading unit 29a is implemented by the HDD controller 505, the media I/F 516, and the DVD-RW drive 514 operated under the instructions received from the CPU 501. The writing-reading unit 29a performs various processing, such as storing various data to the storage unit 2000a, the DVD-RW 513, the recording medium 515, and reading out various data from the storage unit 2000a, the DVD-RW 513, and the recording medium 515.

The communication management unit 30a, implemented by an instruction from the CPU 501 illustrated in FIG. 3, performs input and output of data to and from the transmitting-receiving unit 21a or the like. As illustrated in FIG. 7B, the communication management unit 30a further includes, for example, a transmitting-receiving unit 31a, an acquisition unit 33a, and a determination unit 35a.

Independently of the transmitting-receiving unit 21a, the transmitting-receiving unit 31a transmits and receives various data or information with the content management server 6 via the communication network 9.

The acquisition unit 33a is basically has a function similar to the acquisition unit of the image processing unit 23a. For example, the acquisition unit 33a acquires images by performing a capturing operation of the shared screen "ss," to be described later. The determination unit 35a performs various determinations, such as determining whether or not a user has referred to the acquired image.

Since the functional configuration of the personal terminals 2b and 2c are similar to the functional configuration of the personal terminal 2a, the description thereof is omitted.

Functional Configuration of Common Terminal

Hereinafter, a description is given of a functional configuration of the common terminal 4 with reference to FIG. 7B. As illustrated in FIG. 7B, the common terminal 4 includes, for example, a transmitting-receiving unit 41, a reception unit 42, an image processing unit 43, a display control unit 44, a determination unit 45, a writing-reading unit 49, and a communication management unit 50. Each of these units is a function or functional unit that can be implemented when any of the components illustrated in FIG. 5 is operated under the instruction of the CPU 701 that executes programs loaded from the recording medium 706 on the RAM 703.

Further, each of these units is a function or functional unit that can be implemented when any of the components illustrated in FIG. 5 is operated under the instruction of the CPU of the stick PC 730 that executes programs loaded from the stick PC 730 on the RAM 703. Further, the common terminal 4 includes, for example, a storage unit 4000 implemented by the RAM 703 illustrated in FIG. 5. The storage unit 4000 of the common terminal 4 includes, for example, a shared memorandum database (DB) 4002.

As to the common terminal 4, since the transmitting-receiving unit 41, the reception unit 42, the image processing unit 43, the display control unit 44, the determination unit 45, the writing-reading unit 49, the communication management unit 50, and the storage unit 4000 are similar to the transmitting-receiving unit 21a, the reception unit 22a, the image processing unit 23a, the display control unit 24a, the determination unit 25a, the display switching unit 26a, the display position change unit 27a, the writing-reading unit 29a, the communication management unit 30a, and the storage unit 2000a of the personal terminal 2a, the description thereof is omitted.

Further, as to the common terminal 4, the communication management unit 50 includes a transmitting-receiving unit 51, an acquisition unit 53, and a determination unit 55. Since the transmitting-receiving unit 51, the acquisition unit 53, and the determination unit 55 are similar to the functions of the transmitting-receiving unit 31a, the acquisition unit 33a, and the determination unit 35a, the description thereof is omitted.

Further, the transmitting-receiving unit 41, the reception unit 42, the image processing unit 43, the display control unit 44, the determination unit 45, and the writing-reading unit 49 can be implemented by a web application of web browser, which is used to display the shared board screen. The communication management unit 50 is implemented by a dedicated communication application.

Functional Configuration of Content Management Server

Hereinafter, a description is given of a functional configuration of the content management server 6 with reference to FIG. 7A. As illustrated in FIG. 7A, the content management server 6 includes, for example, a transmitting-receiving unit 61, a schedule acquisition unit 62, an image processing unit 63, a creation unit 64, a determination unit 65, a web page creation unit 66, a search unit 67, an authentication unit 68, and a writing-reading unit 69. Each of these units is a function or functional unit that can be implemented when any of the components illustrated in FIG. 3 is operated under the instruction of the CPU 501 that executes programs loaded from the HD 504 on the RAM 503. Further, the content management server 6 is illustrated in FIG. 3. The content management server 6 includes, for example, a storage unit 6000 implemented by the RAM 503 and the HD 504 illustrated in FIG. 3.

Functional Configuration of Content Management Server

Hereinafter, a description is given of a functional configuration of the content management server 6 in detail.

The transmitting-receiving unit 61 transmits and receives data or information from other terminal, device, or server via the communication network 9.

The schedule acquisition unit 62 acquires schedule information including information of conference, such as bibliographic information of conference, to which each user has participated or is to participate, from a schedule management server 8, which is connected to the communication network 9 for transmitting and receiving various data or information. The schedule management server 8 stores schedule information, such as conference list information, for each user indicated by each user identification (ID).

The image processing unit 63 has a function as an acquisition unit that acquires, for example, images captured by performing a capturing operation of the shared screen "ss" (hereinafter, acquired image or images), to be escribed later.

The creation unit 64 creates unique content identification (ID), personal memorandum identification (ID), shared memorandum identification (ID), or the like.

The determination unit 65 determines whether the content ID, the personal memorandum ID, the shared memorandum ID, or the like are received by the transmitting-receiving unit 61.

The web page creation unit 66 creates data of web page to be displayed using a web browser installed on the personal terminal 2 and the common terminal 4.

The search unit 67 receives a search request from the personal portal screen, which is displayed using the web browser installed on the personal terminal 2 and the common terminal 4, and performs a search corresponding to the search request.

The authentication unit 68 performs authentication processing of user. Further, the authentication unit 68 can be implemented outside the content management server 6. For example, the authentication unit 68 can be implemented by an authentication server connected to the communication network 9.

The writing-reading unit 69 is implemented by the HDD controller 505, the media I/F 516, and the DVD-RW drive 514 operated under the instructions received from the CPU 501. The writing-reading unit 69 performs various processing, such as storing various data to the storage unit 6000, the DVD-RW 513, the recording medium 515, and reading out various data from the storage unit 6000, the DVD-RW 513, and the recording medium 515.

Further, as to the content management server 6, the storage unit 6000 includes, for example, a personal memorandum DB 6001, a shared memorandum DB 6002, an interest level management DB 6003, a personal memorandum management DB 6004, and a shared memorandum management DB 6005.

Further, these databases can be stored in another server other than the content management server 6. If these databases are stored in another server, the timing of data acquisition and transmission may be as follows. For example, the data can be obtained from another server each time the personal terminal 2 requests the data acquisition and transmission, or the data can be stored in the content management server 6 while the conference is being held and the user is referring to the personal board and shared board, and then the data can be transmitted to another server after ending the conference, after referencing the data, or after a certain period of time elapses, and then the data can be removed from the content management server 6.

Further, the group of devices described in the embodiment represents only one of multiple computing environments for implementing the embodiment. In another embodiment, the content management server 6 includes, for example, a plurality of computing devices, such as a server cluster. The multiple computing devices are configured to communicate with each other via any type of communication link, including network or shared memory, to perform the processing disclosed in this disclosure. Similarly, the personal terminal 2 and the common terminal 4 may include multiple computing devices that are configured to communicate with each other.

Further, the content management server 6, the personal terminal 2, and the common terminal 4 can be configured to share the processing steps disclosed in this description, in a variety of combinations. For example, a portion of the processes performed by the content management server 6 may be performed by the personal terminal 2 and the common terminal 4. Further, the functional units of the content management server 6, the personal terminal 2, and the common terminal 4 may be configured into one devices or divided into multiple devices.

Display of Personal Board Screen

Hereinafter, a description is given of an example of the personal board screen 1000 displayed on the personal terminal 2a until an end or termination of a conference with reference to FIGS. 8 to 13. The personal board screen 1000 is a screen used for displaying information to be presented to each user using graphical user interfaces (GUIs), to receive operations from each user. The personal board screen 1000 is one example of display style or mode set by a web browser and application software.

Figure 8:
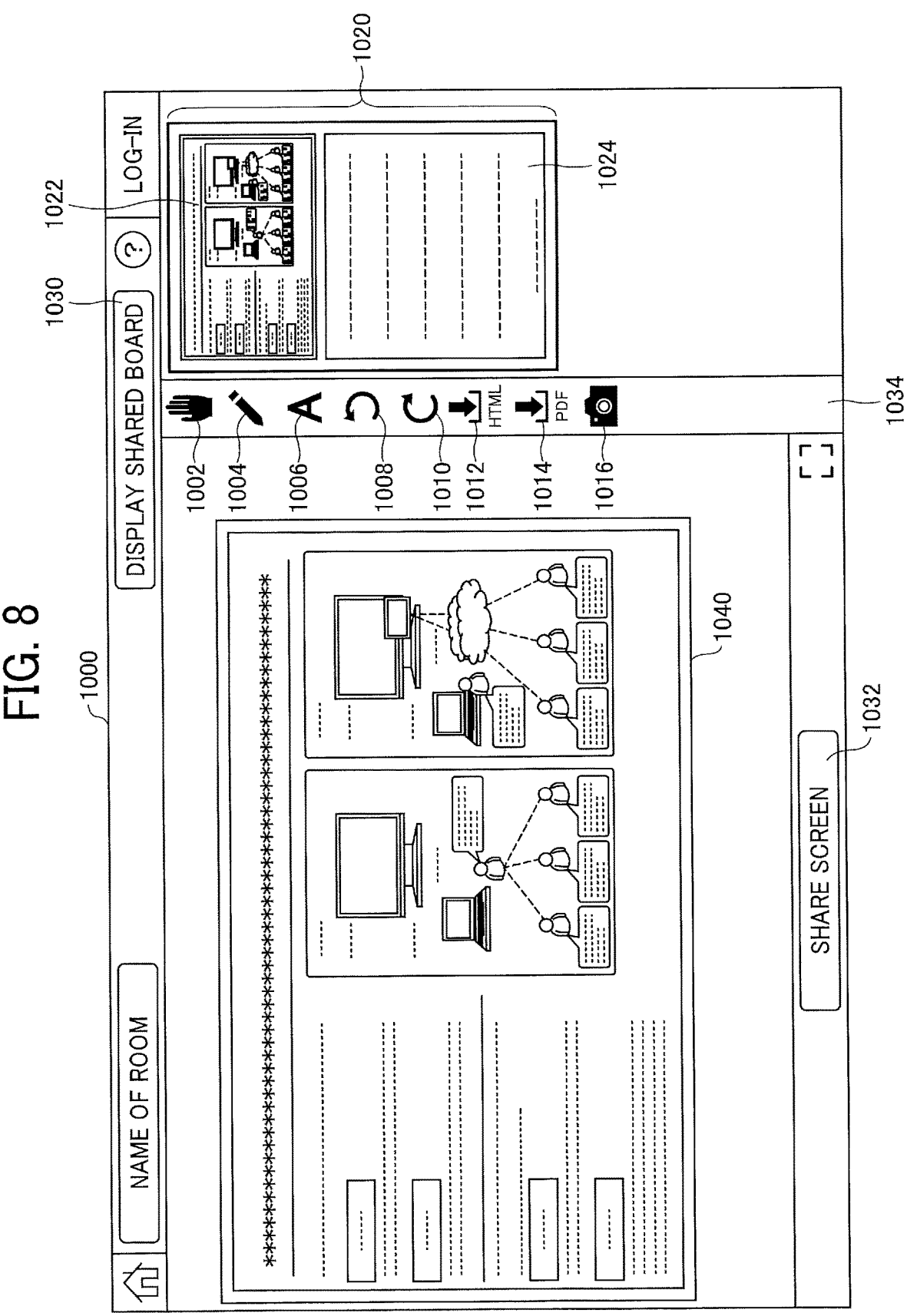
FIG. 8 is an example of personal board screen.

FIG. 8 is an example of the personal board screen 1000 displayable on the personal terminal 2a. As illustrated in FIG. 8, until an end or termination of conference, the personal board screen 1000 displays a tool palette 1034, a shared area on the left side of the tool palette 1034, and a memorandum area on the right side of the tool palette 1034. The shared area displays the shared screen "ss" such as a conference material screen 1040. The conference material screen 1040 is an example of the shared screen "ss." Any material screen or reference screen, which is shared by users, can be displayed on the shared area as the shared screen "ss." For example, the conference material screen may be also referred to as the projection screen.

Further, each time a capture button 1016 is pressed, a sheet area 1020 is added in the memorandum area. The sheet area 1020 displays, for example, a combination of an acquired image 1022 of the conference material screen 1040, and a text memorandum section 1024 associated with the acquired image 1022.

When a user presses the capture button 1016, the conference material screen 1040 displayed on the shared area is captured as the acquired image 1022, and then the sheet area 1020 displaying a combination of the acquired image 1022 and the text memorandum section 1024 can be displayed in the memorandum area additionally. Further, the pressing of the capture button 1016 is one example operation. For example, an operation of pressing a shortcut key on a keyboard or a gesture operation on a touch panel can be used to capture the acquired image 1022.

Further, before displaying the conference material screen 1040, the personal board screen 1000 can display, for example, a guide message of "conference material screen is to be displayed here" in an area to be used as the shared area.

Further, the memorandum area may display a guide message of "acquired image is to be displayed." By displaying the guide message, before performing a first-time screen capture operation, the personal board screen 1000 of FIG. 8 can inform a user how a screen image is to be displayed after performing the screen capture operation. Further, the guidance message may not be displayed in some cases. Further, the personal board screen 1000 can be configured to receive an user input to the text memorandum section 1024 even before performing the first-time screen capture operation.

When content data such as stream data is transmitted to the shared screen "ss," the shared area of the personal board screen 1000 (FIG. 8) displays a screen of content data, such as stream data, transmitted to the shared screen "ss" as the conference material screen 1040. The personal board screen 1000 can receive an operation of pressing the capture button 1016 performed by a user.

When the user presses the capture button 1016, the capturing of the conference material screen 1040 currently displayed on the shared area is performed, and then the acquired image 1022 of the conference material screen 1040 can be displayed in the memorandum area. Further, the text memorandum section 1024 associated with the acquired image 1022 can be displayed in the memorandum area. When the acquired image 1022 and the text memorandum section 1024 associated with the acquired image 1022 are displayed on, for example, the sheet area 1020 (one sheet), a combination of the acquired image 1022 and the text memorandum section 1024 can be displayed as easily recognizable information.

Further, when the user presses the capture button 1016, the conference material screen 1040 at the time of pressing the capture button 1016 can be compared with the acquired image 1022 of the conference material screen 1040, captured previously and being displayed in the memorandum area, to prevent capturing the same content.

Further, when the user presses the capture button 1016, a mouse cursor can be set at the first line of the text memorandum section 1024, which is newly displayed by pressing the capture button 1016. Therefore, the user can easily shift from the operation of pressing the capture button 1016 to the operation of text memorandum of the text memorandum section 1024. Further, the text memorandum section 1024 can be extended each time a user inputs text memorandum within the resource capacities of the storage area of the storage unit 2000a.

Further, an object can be drawn on the acquired image 1022 using a pen tool or the like. As illustrated in FIG. 8, the personal board screen 1000 displays the tool palette 1034 displaying, for example, a hand tool button 1002, a pen tool button 1004, a text tool button 1006, an un-do button 1008, a re-do button 1010, an HTML save button 1012, a portable document format (PDF) save button 1014, and the capture button 1016.

The hand tool button 1002 is a button used by a user to initiate a use of a hand tool. By using the hand tool, the user can select an object drawn on the acquired image 1022 and move the object by a drag-and-drop operation.

The pen tool button 1004 is a button used by a user to start a use of a pen tool. By using the pen tool, the user can select color and line width, and draw an object on the acquired image 1022.

The text tool button 1006 is a button used by a user to initiate a use of a text tool. By using the text tool, the user can generate a text area on the acquired image 1022 and enter text data.

The un-do button 1008 is a button used for canceling an operation work that was performed. The re-do button 1010 is a button used for performing the operation work that was cancelled by pressing the un-do button 1008.

The HTML save button 1012 is a button used for locally storing information of the personal board screen 1000 using HTML file.

The PDF save button 1014 is a button used for locally storing the acquired image 1022 and the text memorandum section 1024 displayed in the memorandum area of the personal board screen 1000 using PDF file.

The capture button 1016 is a button used for capturing the conference material screen 1040 being displayed on the shared area, and used for additionally displaying the sheet area 1020 that displays the combination of the acquired image 1022 and the text memorandum section 1024 in the memorandum area.

Further, an object drawn on the acquired image 1022 can be deleted by using a delete key or backspace key. Further, the sheet area 1020 can be deleted by using the delete key or backspace key.

While performing the editing operation, such as drawing an object on the acquired image 1022 and inputting text memorandum to the text memorandum section 1024, the shared area may be reduced to enlarge the memorandum area so that the editing operation can be performed easily, in which a display style is changed, such as reducing a size of the shared area and enlarging a size of the memorandum area are performed. The reduction of the shared area and the enlargement of the memorandum area may be performed automatically by a web application, or may be performed by a manual operation of a user, such as moving the tool palette 1034 to the left side.

Further, the enlargement of the size of the shared area and the reduction of the size of the memorandum area may be performed automatically by the web application, or may be performed by a manual operation of a user, such as moving the tool palette 1034 to the right side, in which the display style is changed, such as enlarging the size of the shared area and reducing the size of the memorandum area are performed.

Figure 9:
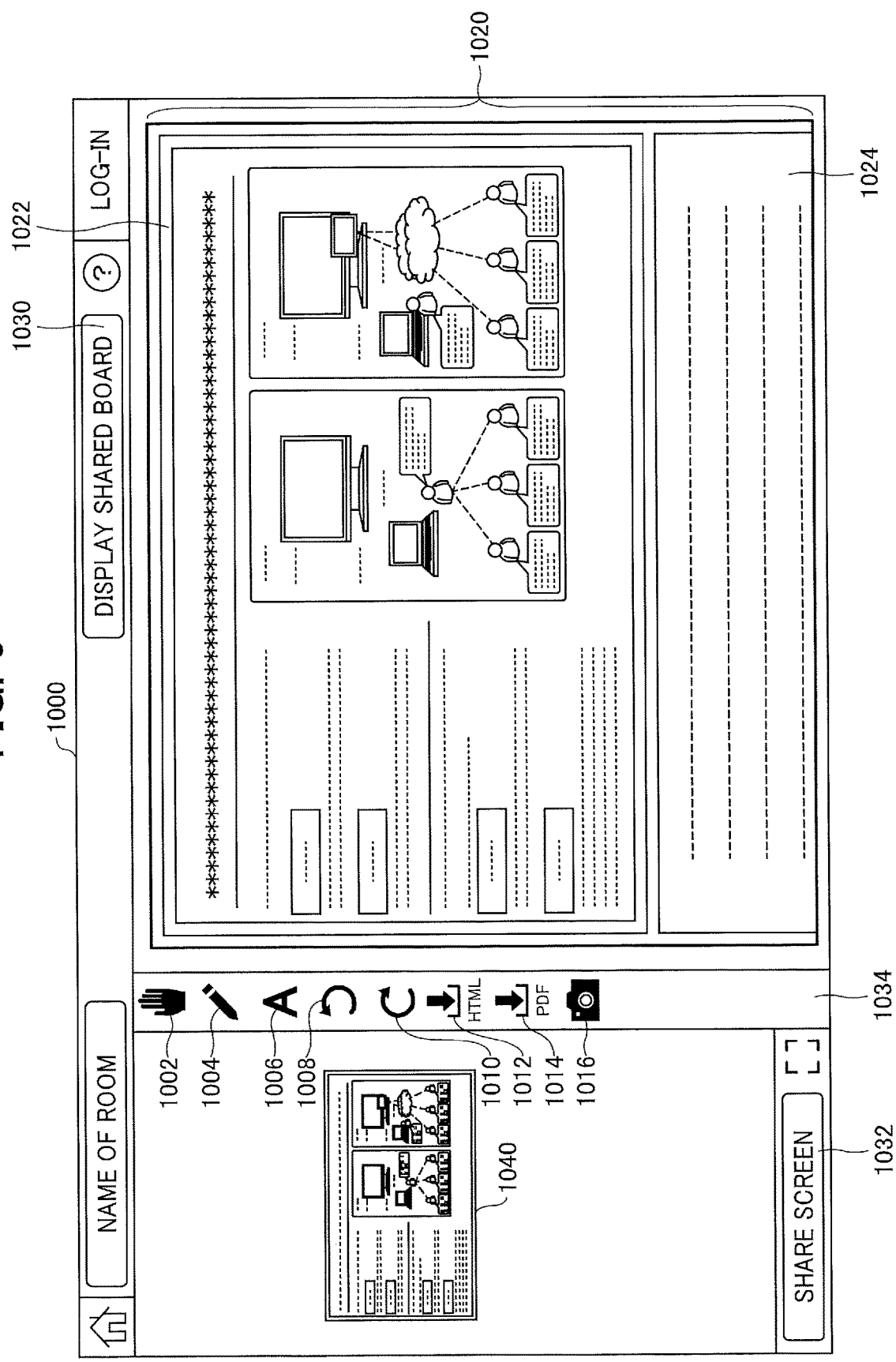
FIG. 9 is an example of personal board screen, in which a shared area is reduced and a memorandum area is enlarged.

FIG. 9 is an example of the personal board screen 1000, in which the size of shared area is reduced and the size of the memorandum area is enlarged. The personal board screen 1000 illustrated in FIG. 9 displays the tool palette 1034 at a position closer to the left side compared to the personal board screen 1000 of FIG. 8, with which the size of the shared area is reduced and the size of the memorandum area is enlarged as illustrated in FIG. 9. As a result, the conference material screen 1040 of the shared area of FIG. 9 is reduced compared to the conference material screen 1040 of the shared area of FIG. 8. Further, the acquired image 1022 and the text memorandum section 1024 in the memorandum area of FIG. 9 are enlarged compared to the acquired image 1022 and text memorandum section 1024 in the memorandum area of FIG. 8

Figure 10:
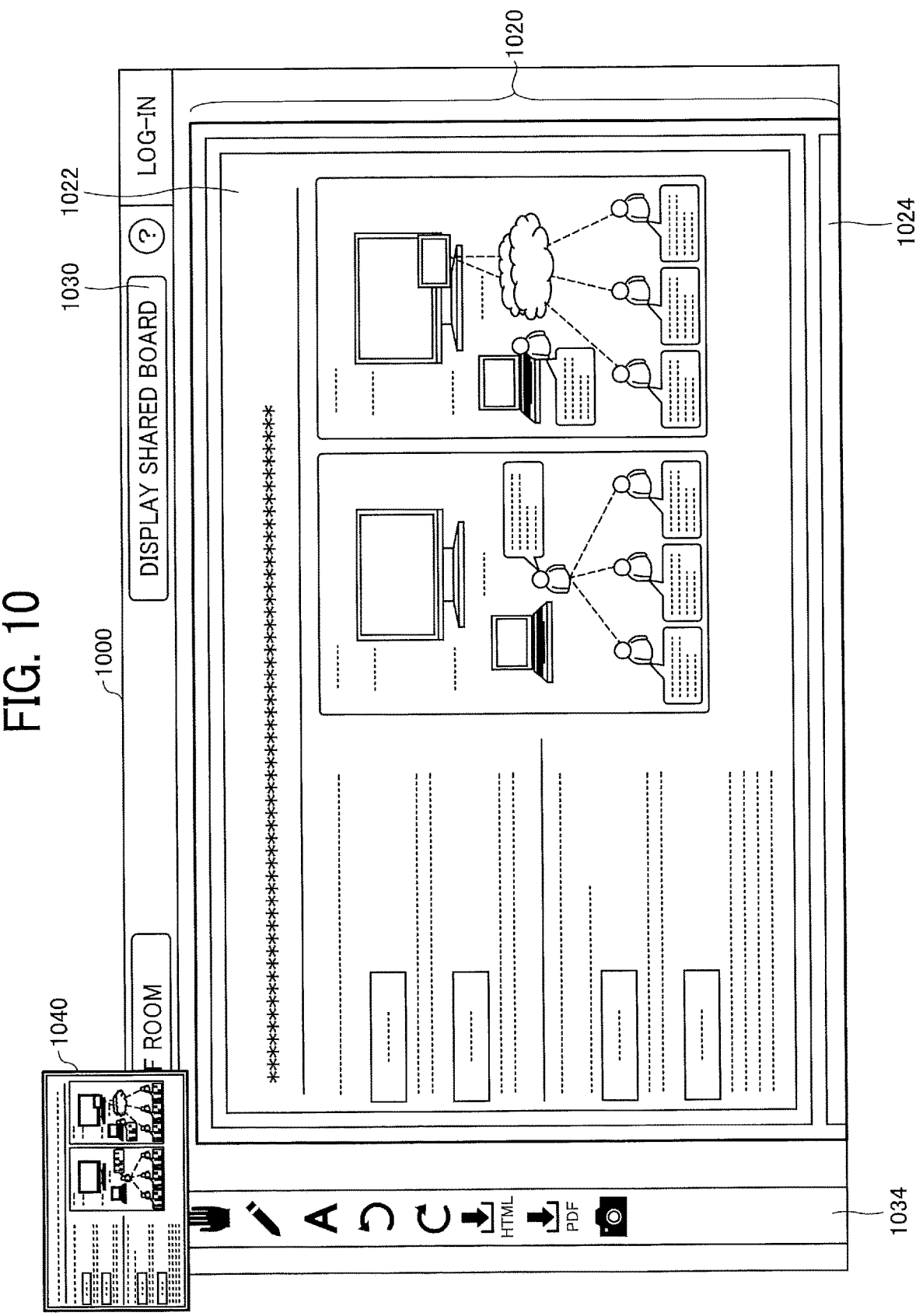
FIG. 10 is an example of personal board screen, in which a shared area is displayed using a picture-in-picture mode.

When the tool palette 1034 is further moved to the left side from the state of the personal board screen 1000 of FIG. 9, and then the size of the shared area becomes equal to or less than a given size, a display mode of the shared area is switched to a picture-in-picture mode as illustrated in FIG. 10.

FIG. 10 is an example of the personal board screen 1000, in which the shared area is displayed using the picture-in-picture mode. The picture-in-picture mode is a function implemented by the operating system (OS). When the picture-in-picture mode is set, a first display area (e.g., window) of a web application and a second display area (e.g., floating window) can be set, with which the first display area (e.g., window) and the second display area (floating window) can be displayed concurrently. The floating window (second display area) is a special window that can be always displayed over of the window (first display area), and the floating window (second display area) can be moved by the drag-and-drop operation.

In the embodiment, by using the picture-in-picture mode, the conference material screen 1040, which was displayed on the personal board screen 1000, can be displayed as the floating window (second display area) as illustrated in FIG. 10.

Further, a process of switching the display mode of the conference material screen 1040 from a primary display mode (or normal display mode, normal mode) displaying the conference material screen 1040 normally on the personal board screen 1000 into a secondary display mode (or picture-in-picture mode) displaying the conference material screen 1040 as the floating window can be referred to as a process of switching the display mode of the conference material screen 1040 displayed at the first display area set by a web browser operating on the operating system (OS), to the second display area operating on the operating system (OS). In this description, the floating window is an example of location-changeable display area.

When the conference material screen 1040 is displayed over the personal board screen 1000 as the floating window (second display area) as illustrated in FIG. 10, a user can enter memorandum in the size-enlarged memorandum area while checking the conference material screen 1040 displayed as the floating window, with which improving a user operability.

Further, for example, when the tool palette 1034 is moved to the right side from the state of the personal board screen 1000 of FIG. 10, and then the size of the shared area exceeds a given size, the display mode of the shared area can be switched from the display using the picture-in-picture mode to the display using a normal display mode (displaying in the first display area performed by the web application) as illustrated in FIG. 9.

Further, the conference material screen 1040 displayed as the floating window in the state of FIG. 10 can be moved by the drag-and-drop operation performed by a user.

Figure 11:
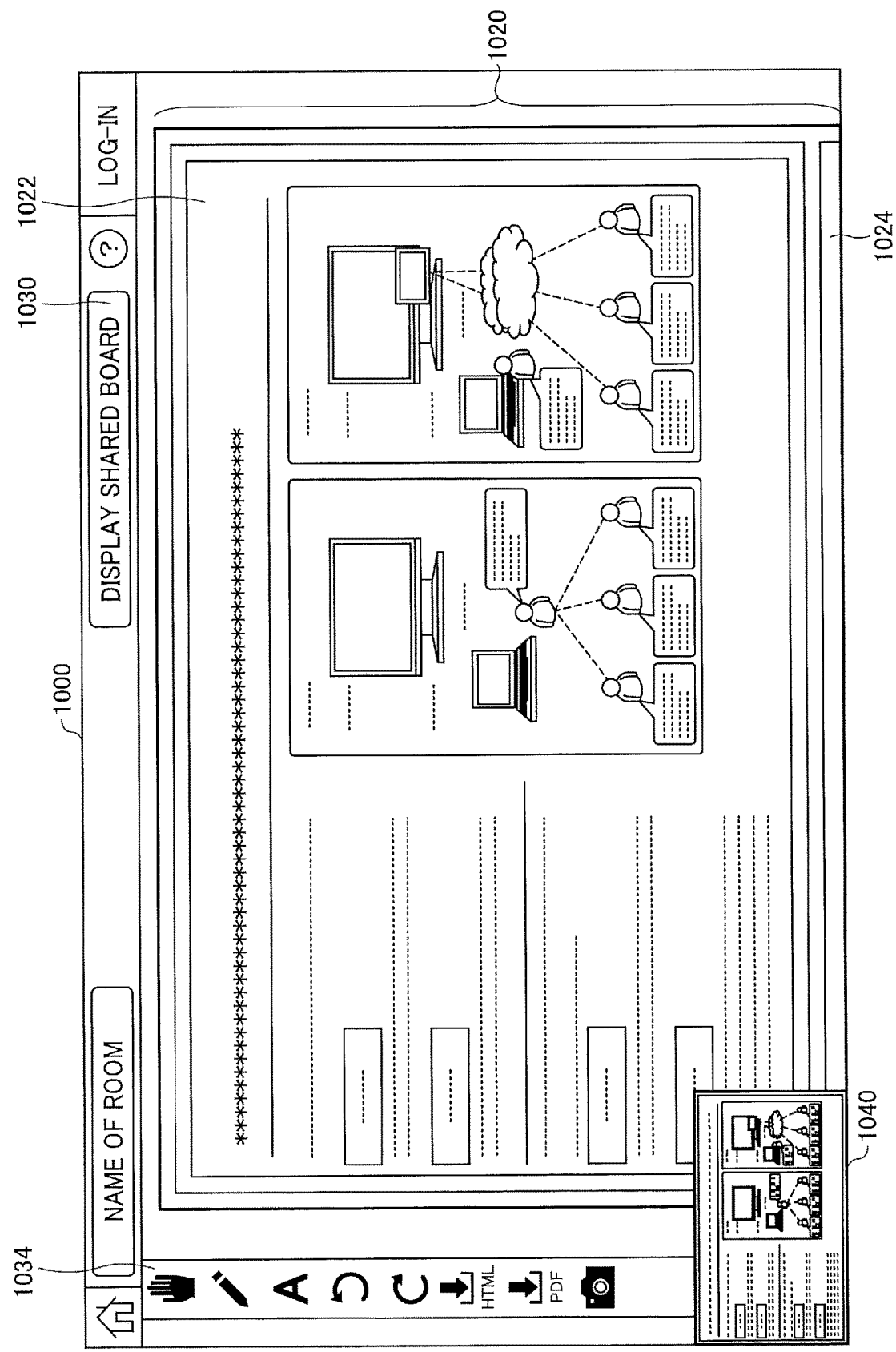
FIG. 11 is an example of personal board screen, in which a floating window is moved by a drag-and-drop operation performed by a user.

FIG. 11 is an example of the personal board screen 1000, in which the floating window is moved by the drag-and-drop operation performed by the user. FIG. 11 illustrates an example of the personal board screen 1000, in which the conference material screen 1040 displayed as the floating window is moved to the lower-left position of the personal board screen 1000 by the drag-and-drop operation performed by the user.

Figure 12:
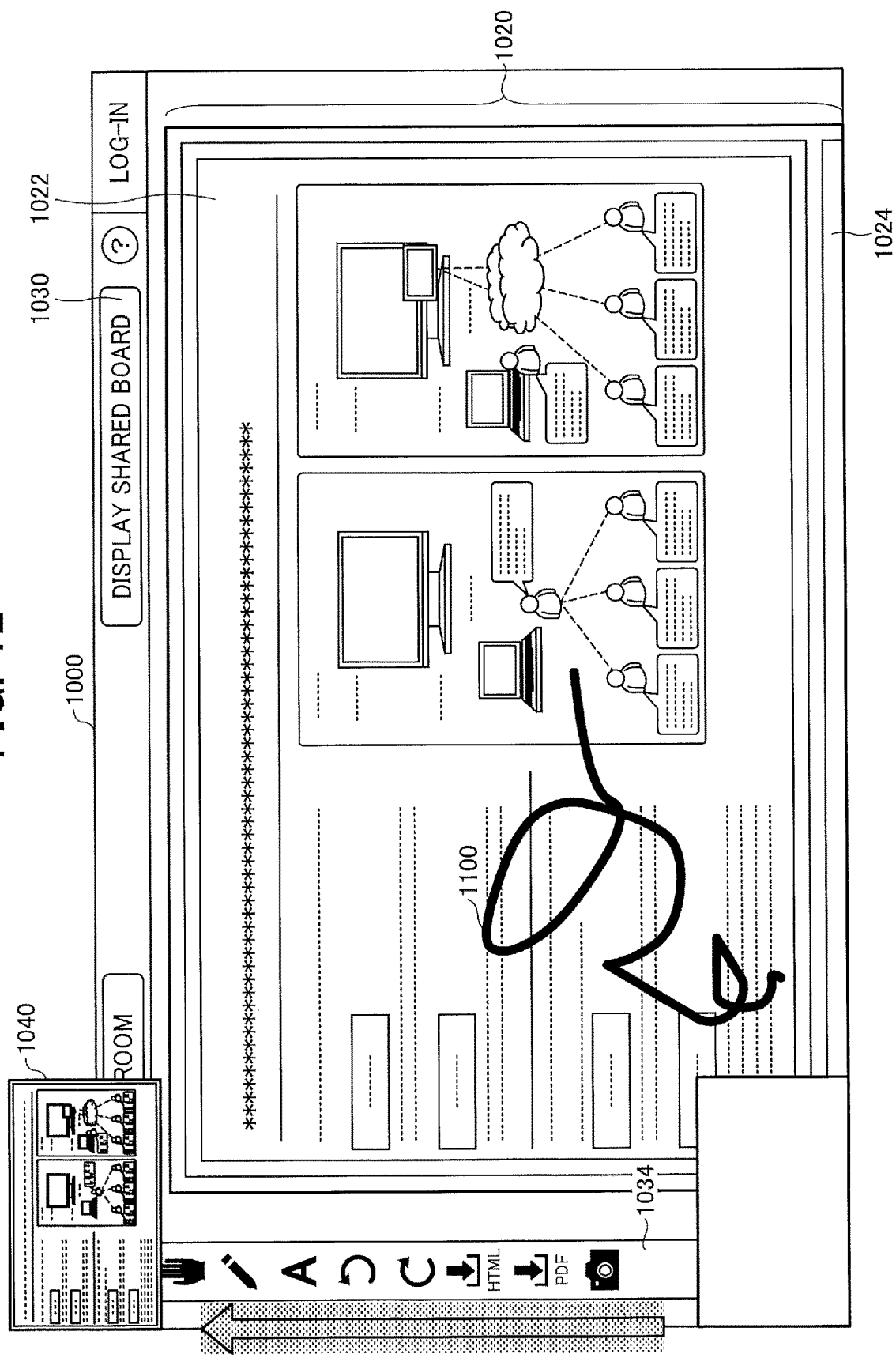
FIG. 12 is an example of movement of a floating window in a case where a finger writing a line is approaching the floating window from the horizontal direction.
Figure 13:
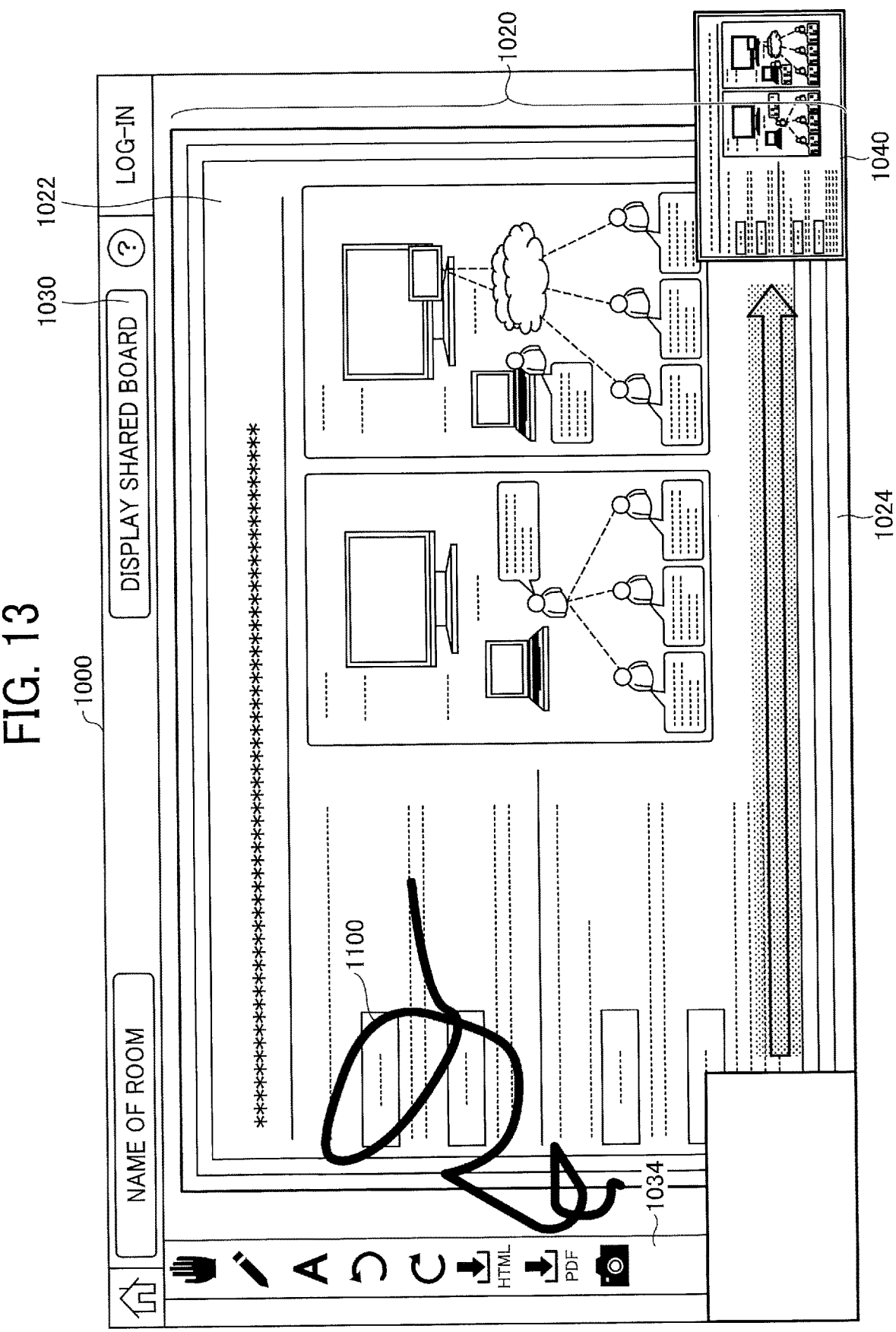
FIG. 13 is an example of movement of a floating window in a case where a finger writing a line is approaching the floating window from the vertical direction.

Further, if a user uses a finger to write a line 1100 (see FIGS. 12 and 13) on the memorandum area at the state of FIG. 11, and the finger writing the line 1100 approaches within a given distance of the floating window displaying the conference material screen 1040, the floating window is moved away from the finger that is writing the line 1100 as illustrated in FIG. 12 or 13. In the embodiment, the user operates the touch panel of the personal terminal 2 using the finger, but is not limited thereto. The of method user operation is not limited to the finger operation, but a mouse operation or a touch pen operation may be used. Therefore, the finger described with reference to FIG. 11 and other drawings can be replaced by other means, such as a cursor, a mouse pointer, and a pen that can contact the touch panel.

FIG. 12 is an example of movement of the floating window in a case where the finger writing the line 1100 is approaching the floating window from the horizontal direction. In an example case illustrated in FIG. 12, the floating window moves in the vertical direction when the finger writing the line 1100 has approached within the given distance of the floating window from the horizontal direction.

Further, FIG. 13 is an example of movement of the floating window in a case where the finger writing the line 1100 is approaching the floating window from the vertical direction. In an example case illustrated in FIG. 13, the floating window moves in the horizontal direction when the finger writing the line 1100 has approached within the given distance of the floating window from the vertical direction.

Processing and Operation

Hereinafter, a description is given of processing and operation of the embodiment. In the embodiment, a description is given of a conference that is performed in a room by users participating the conference while displaying the personal board screen 1000 on the personal terminal 2 until the end of the conference.

Figure 14:
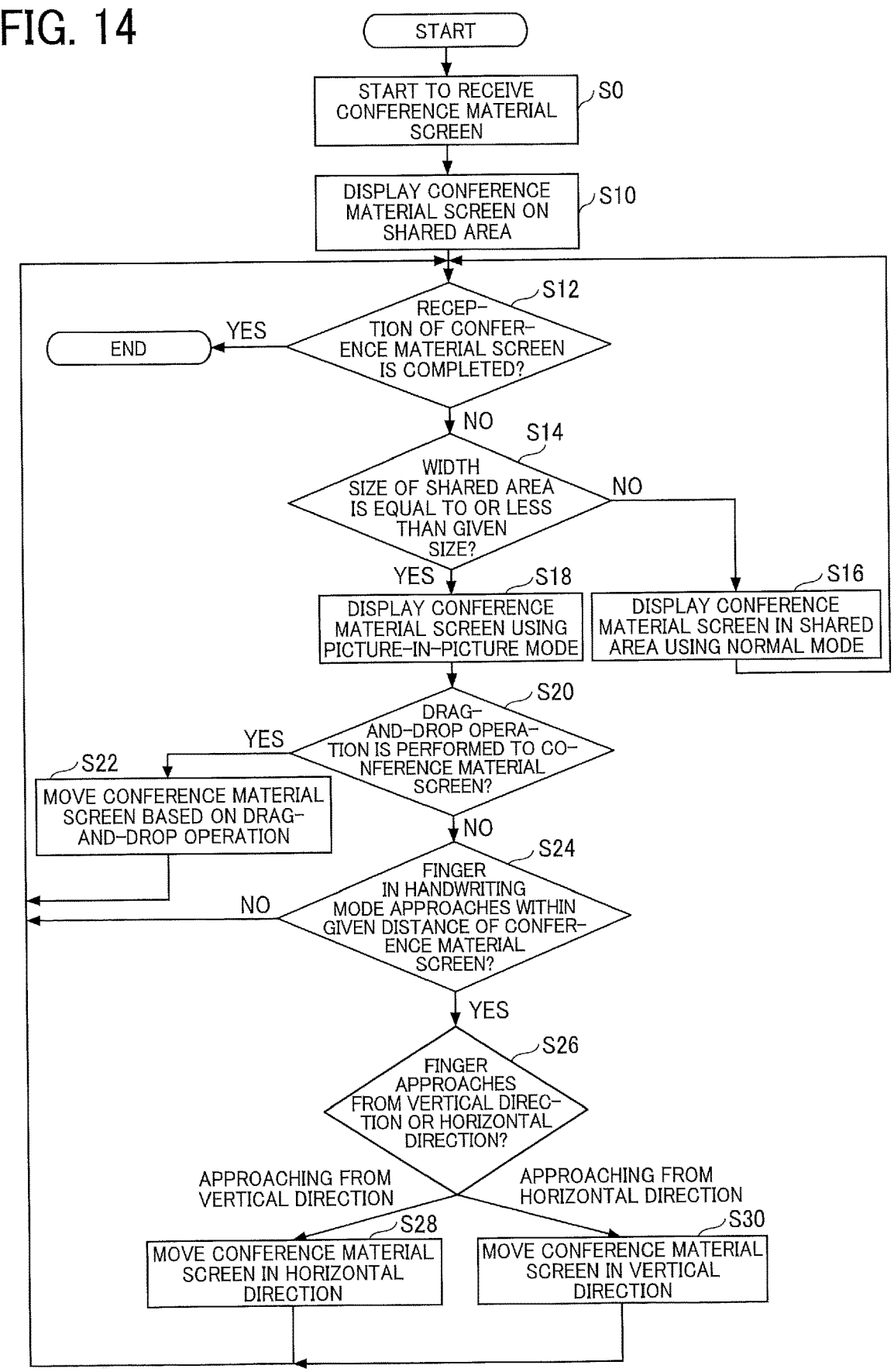
FIG. 14 is a flowchart illustrating processing of the information sharing system according to an embodiment.

FIG. 14 is a flowchart illustrating processing of the information sharing system according to the embodiment. For example, it can be assumed that one conference is held by participating a first user who operates the personal terminal 2*a*, and a second user who operates the personal terminal 2*b* (see FIG. 1), in which the one conference may be started when the first user (presenter) uses the personal terminal 2*a* to perform a streaming data transmission to the shared screen "ss," and the personal terminal 2*b* has started to receive the conference material screen 1040 in step S0.

In step S10, for example, the display control unit 24*b* of the personal terminal 2*b* displays the conference material screen 1040 on the shared area of the personal board screen 1000 as illustrated in FIG. 8. Then, the display control unit 24*b* of the personal terminal 2*b* repeats the sequence of steps S12 to S30 until the reception of the conference material screen 1040 is completed.

For example, while the personal board screen 1000 of FIG. 8 is being displayed, a participant (e.g. second user) can operate the personal terminal 2*b* to adjust a display ratio of a left-side of the tool palette 1034 used as the shared area, and a right-side of the tool palette 1034 used as the memorandum area on the personal board screen 1000.

In step S14, the display switching unit 26*b* of the personal terminal 2*b* determines whether a width size of the shared area on the personal board screen 1000 is equal to or less than a given size.

If the width size of the shared area is not equal to or less than the given size, (S14: NO), that is, if the width size of the shared area is greater than the given size, the display switching unit 26*b* proceeds the sequence to step S16, and then the display switching unit 26*b* displays the conference material screen 1040 in the shared area of the personal board screen 1000 in step S16 using the normal display mode.

Further, if the width size of the shared area is equal to or less than the given size (S14: YES), the display switching unit 26*b* proceeds the sequence to step S18, and then the display switching unit 26*b* displays the conference material screen 1040 using the picture-in-picture mode in step S18 as illustrated in FIG. 10.

Then, for example, the participant (second user) can operate the personal terminal 2*b* to move the conference material screen 1040 being displayed as the floating window by performing the drag-and-drop operation as illustrated in FIGS. 10 and 11.

In step S20, the OS of the personal terminal 2*b* determines whether or not the drag-and-drop operation is performed to the conference material screen 1040 being displayed as the floating window.

If the conference material screen 1040 being displayed as the floating window receives the drag-and-drop operation (S20: YES), the OS of the personal terminal 2*b* proceeds the sequence to step S22.

In step S22, the OS of the personal terminal 2*b* moves the conference material screen 1040 being displayed as the floating window as illustrated in FIG. 10 based on the drag-and-drop operation received from the participant (second user).

If the conference material screen 1040 being displayed as the floating window does not receive the drag-and-drop operation (S20: NO), the display position change unit 27*b* of the personal terminal 2*b* proceeds the sequence to step S24.

In step S24, the display position change unit 27*b* determines whether a user finger writing the line 1100 using the handwriting mode as illustrated in FIGS. 12 and 13 has approached within a given distance of the conference material screen 1040 being displayed as the floating window.

If the user finger writing the line 1100 using the handwriting mode has approached within the given distance of the conference material screen 1040 being displayed as the floating window (S24: YES), the display position change unit 27*b* proceeds the sequence to step S26.

In step S26, the display position change unit 27*b* determines whether the user finger writing the line 1100 has approached within the given distance of the conference material screen 1040 from the vertical direction or the horizontal direction.

If the user finger writing the line 1100 has approached within the given distance of the conference material screen 1040 being displayed as the floating window from the vertical direction (S26: approaching from vertical direction), the display position change unit 27*b* proceeds the sequence to step S28.

In step S28, the display position change unit 27*b* moves the conference material screen 1040 being displayed as the floating window in the horizontal direction as illustrated in FIG. 13.

Further, if the user finger writing the line 1100 has approached within the given distance of the conference material screen 1040 being displayed as the floating window from the vertical direction (S26: approaching from vertical direction), the display position change unit 27b proceeds the sequence to step S30.

In step S30, the display position change unit 27b moves the conference material screen 1040 being displayed as the floating window in the vertical direction as illustrated in FIG. 12.

Figure 15:
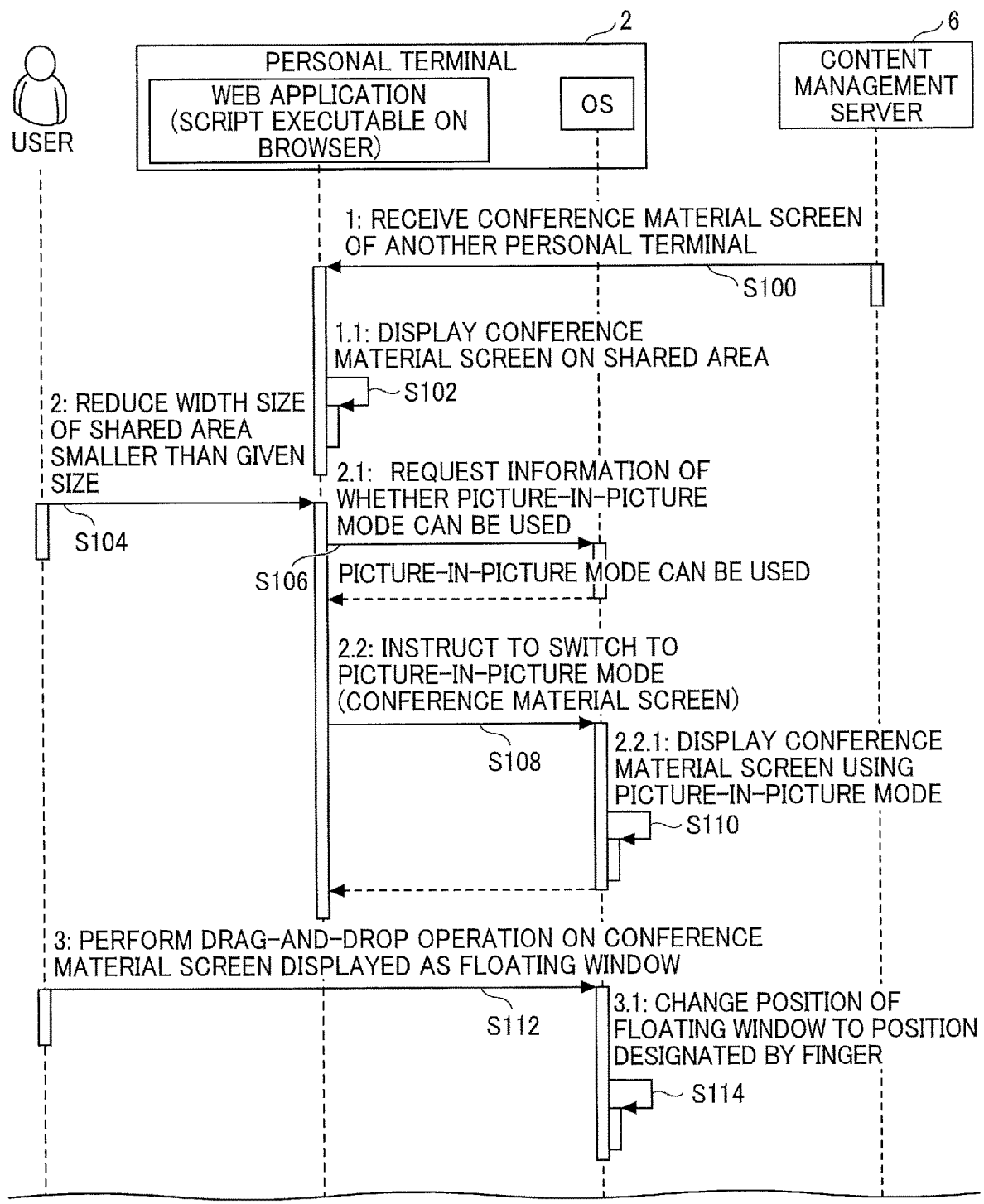
FIGS. 15 and 16 illustrate an example of a sequence diagram of processing performed in the information sharing system according to an embodiment.
Figure 16:
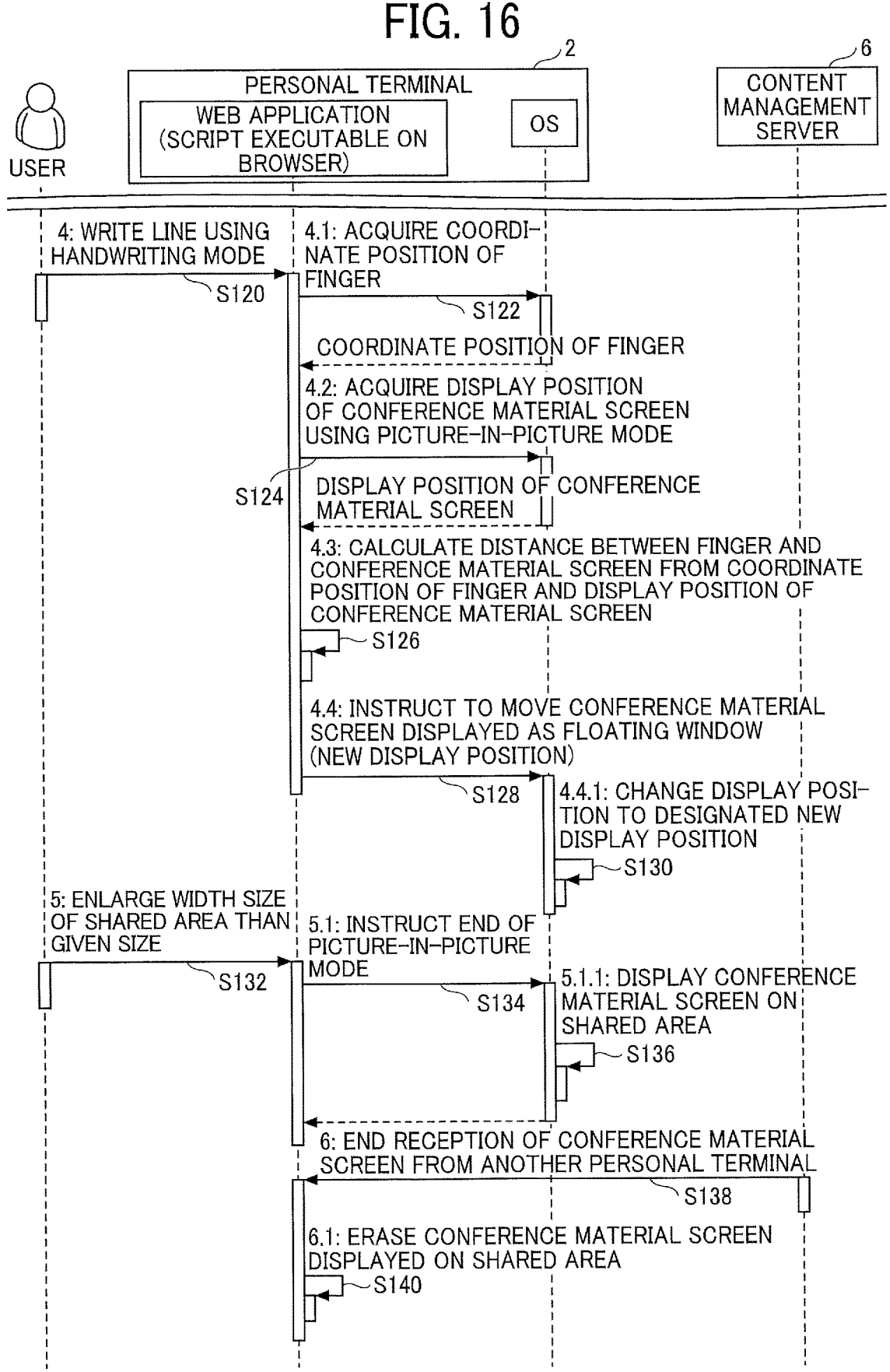

FIGS. 15 and 16 illustrate an example of a sequence diagram of processing performed in the information sharing system according to the embodiment.

In step S100, for example, the personal terminal 2b receives the conference material screen 1040 of another personal terminal (e.g., personal terminal 2a) via the content management server 6.

In step S102, the display control unit 24b of the personal terminal 2b, implemented by the web application installed on the personal terminal 2b, displays the conference material screen 1040 on the shared area of the personal board screen 1000 as illustrated in FIG. 8.

In step S104, the display switching unit 26b of the personal terminal 2b, implemented by the web application installed on the personal terminal 2b, receives an operation of reducing the width size of the shared area set on the left-side of the tool palette 1034 of the personal board screen 1000 to a size smaller than a given size from the participant. In this description, the participant may be also referred to as the user or actor.

In step S106, the display switching unit 26b of the personal terminal 2b requests, the operating system, information of whether or not the picture-in-picture mode can be used. Hereinafter, it is assumed that the display switching unit 26b receives the information of the picture-in-picture mode can be used from the OS.

In step S108, the display switching unit 26b instructs the OS to switch a display mode of the conference material screen 1040, displayed on the shared area of the personal board screen 1000, to a display mode using the picture-in-picture mode.

In response to receiving the instruction of the display using the picture-in-picture mode, in step S110, the OS displays the conference material screen 1040 using the picture-in-picture mode as illustrated in FIG. 10.

In step S112, the participant (user, actor) performs the drag-and-drop operation to the conference material screen 1040 being displayed as the floating window as illustrated in FIG. 10.

In step S114, based on the drag-and-drop operation received from the participant, the OS changes a display position of the floating window to a position designated by the finger.

In step S120, the display position change unit 27b of the personal terminal 2b receives an operation of writing the line 1100 using the handwriting mode as illustrated in FIGS. 12 and 13 from the participant.

In step S122, the display position change unit 27b acquires coordinate position of the user finger writing the line 1100 using the handwriting mode from the OS.

In step S124, the display position change unit 27b acquires a display position of the conference material screen 1040 being displayed using the picture-in-picture mode from the OS.

In step S126, the display position change unit 27b of the personal terminal 2b calculates a distance between the user finger writing the line 1100 using the handwriting mode and the conference material screen 1040 being displayed as the floating window based on the coordinate position of the finger acquired in step S122, and the display position of the conference material screen 1040, being displayed using the picture-in-picture mode, acquired in step S124.

Then, based on the distance calculated in step S126, the display position change unit 27b of the personal terminal 2b determines whether the user finger writing the line 1100 using the handwriting mode has approached within the given distance of the conference material screen 1040 being displayed as the floating window. Hereinafter, it is assumed that the user finger writing the line 1100 has approached within the given distance of the conference material screen 1040 being displayed as the floating window.

In step S128, the display position change unit 27b of the personal terminal 2b determines whether the user finger writing the line 1100 using the handwriting mode has approached the conference material screen 1040, being displayed as the floating window, from the vertical direction or the horizontal direction.

In step S128, if the display position change unit 27b of the personal terminal 2b determines that the user finger writing the line 1100 has approached the conference material screen 1040 being displayed as the floating window from the vertical direction, the display position change unit 27b designates a new display position to move the conference material screen 1040 being displayed as the floating window into the horizontal direction, and instructs the OS to move the conference material screen 1040 being displayed as the floating window into the horizontal direction.

Further, in step S128, if the display position change unit 27b determines that the user finger writing the line 1100 has approached the conference material screen 1040 being displayed as the floating window from the horizontal direction, the display position change unit 27b designates a new display position to move the conference material screen 1040 being displayed as the floating window into the vertical direction, and instructs the OS to move the conference material screen 1040 being displayed as the floating window into the vertical direction.

Then, in step S130, the OS changes the display position of the conference material screen 1040 being displayed as the floating window to the designated new display position.

In step S132, the display switching unit 26b of the personal terminal 2b receives, from the participant, an operation of enlarging the width size of the shared area, set on the left-side of the tool palette 1034 of the personal board screen 1000 than a given size.

In step S134, the display switching unit 26b instructs, to the OS, an end of the picture-in-picture mode to switch the display of the conference material screen 1040 being displayed as the floating window using the picture-in-picture mode to a display of the conference material screen 1040 using the normal display mode.

In step S136, the OS, which has received the instruction to switch to the display using the normal display mode, performs a control for displaying the conference material screen 1040 on the shared area of the personal board screen 1000.

In step S138, the display control unit 24b of the personal terminal 2b ends or terminates the reception of the conference material screen 1040 from another personal terminal (e.g., personal terminal 2a) via the content management server 6.

In step S140, the display control unit 24b of the personal terminal 2b erases the conference material screen 1040, displayed on the shared area of the personal board screen 1000 as illustrated in FIG. 8.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Figure 17:
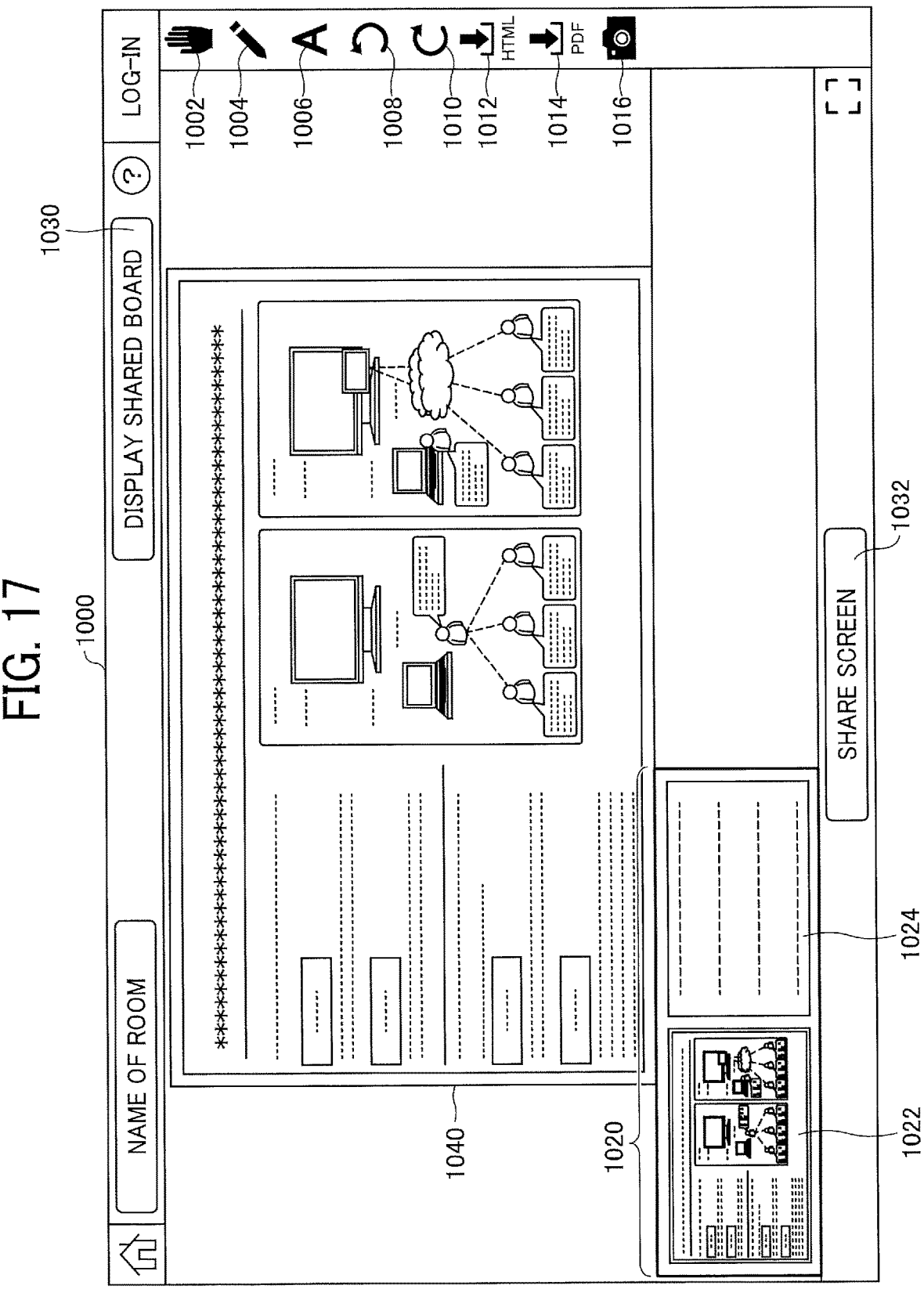
FIG. 17 illustrates another example of personal board screen, in which a memorandum area is displayed on a lower side of a shared area.

For example, the personal board screen 1000 is not limited to a screen that displays the memorandum area on the right side of the shared area as in illustrated in FIG. 8. For example, the memorandum area may be displayed on the left side of the shared area, or the memorandum area may be displayed on the lower side of the shared area as illustrated in FIG. 17. FIG. 17 illustrates another example of the personal board screen 1000, in which the memorandum area is displayed on the lower side of the shared area. Further, the memorandum area may be displayed on the upper side of the shared area.

If the memorandum area is displayed on the left side of the shared area, the size of the shared area is reduced and the size of the memorandum area is enlarged when a user performs an operation of moving the tool palette 1034 to the right side, while the size of the shared area is enlarged and the size of the memorandum area is reduced when the user performs an operation of moving the tool palette 1034 to the left side.

Further, if the memorandum area is displayed on the lower side of the shared area, the size of the shared area is reduced and the size of the memorandum area is enlarged when the user performs an operation of moving the tool palette 1034 to the upper side, while the size of the shared area is enlarged and the size of the memorandum area is reduced when the user performs an operation of moving the tool palette 1034 to the lower side.

Further, if the memorandum area is displayed on the upper side of the shared area, the size of the shared area is reduced and the size of the memorandum area is enlarged when the user performs an operation of moving the tool palette 1034 to the lower side, while the size of the shared area is enlarged and the size of the memorandum area is reduced when the user performs an operation of moving the tool palette 1034 to the upper side.

Further, the operation of moving the tool palette 1034 to any one of the upper side, lower side, left side, and right side is examples of operations, but are not limited thereto. For example, an operation of moving a dividing line to any one of the upper side, lower side, left side, and right side can be performed, an operation on a user interface (UI), such as a button for adjusting a display ratio of the shared area and the memorandum area can be performed, an operation using a shortcut key can be performed, and an operation of pinch-in and pinch-out can be performed.

As to the above described embodiment of this disclosure, the information processing apparatus, which can improve an user operability to a screen including a display area for receiving an input operation performable by a user, can be provided.

Each of the functions of the embodiment described above can be implemented by one or more processing circuits. Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The group of devices described in the embodiment merely indicates one of the multiple computing environments for implementing the embodiment disclosed herein.

In another configuration of the embodiment, the content management server 6 includes a plurality of computing devices, such as a server cluster. The plurality of computing devices are configured to communicate with each other via any type of communication link, such as the communication network 9 and/or the shared memory, and can perform the processing described herein. Similarly, the common terminal 4 may include a plurality of computing devices configured to communicate with each other.

Further, the personal terminal 2, the common terminal 4, and the content management server 6 can be configured to share the above described processing steps using various combination patterns. For example, the processes performed by given units can be performed by the personal terminal 2. Similarly, the functions performed by the given units can be performed by the common terminal 4 and/or the content management server 6. Further, the functional units or elements of the content management server 6, the personal terminal 2, and the common terminal 4 can be integrated into one devices or divided into multiple devices.

Further, the personal terminal 2 and/or the common terminal 4 may be, for example, an output device such as projector (PJ), digital signage, head-up display device, industrial machinery, imaging device, sound collecting device, medical device, networked home appliance, automobile (e.g., connected car), game machine, personal digital assistant (PDA), digital camera, wearable personal computer (PC), or the like.

In this description, the personal board screen 1000 is an example of screen including "a first display area" used for displaying one or more images that are shared by a plurality of devices as a shared image, and a "second display area" used for receiving an input operation performable by a user. The conference material screen 1040 is an example of screen including "the first display area used for displaying one or more images that are shared by the plurality of devices as shared image." The memorandum area is an example of screen including "the second display area that can receive the input operation." The operation of handwriting the line 1100 by a user on the memorandum area is an example of "input operation to the second display area used for displaying data." The display control unit 24b is an example of display control means. The display switching unit 26b is an example of display switching means. The display position change unit 27b is an example of display position change means. The floating window is an example of display area set by the operating system. The floating window is the location-changeable display area as above described.

Each function of the embodiments described above may be implemented by one or more processing circuits. Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus comprising: circuitry configured to
   display, on a display, a first display area used for displaying an image shared with a plurality of devices participating in a conference as a shared image, and a second display area used for receiving a user input; and switch a display mode of the shared image based on a user operation of changing a display style of the second display area, wherein a size of the first display area is enlargeable and reduceable by an operation in a predetermined size range without changing the display mode to display the shared image as a floating window, and wherein, upon an operation of reducing the size of the first display area to less than the predetermined size range, the circuitry is configured to change the display mode to display the shared image as a floating window;

wherein the size of the first display area is enlargeable and reduceable by an operation in another size range without changing from the display mode of displaying the shared image as the floating window to a normal mode for displaying the shared image, and wherein, upon an operation of enlarging the size of the first display area to greater than said another size range, the circuitry is configured to change the display mode to the normal mode for displaying the shared image.

2. The information processing apparatus according to claim 1, wherein the operation of changing the display style of the second display area is an operation for enlarging a size of the second display area.

3. The information processing apparatus according to claim 1, wherein the operation of changing the display style of the second display area is a user input to the second display area used for displaying data.

4. The information processing apparatus according to claim 3, wherein in response to receiving a user input for instructing to display data on the second display area, the circuitry changes a display position of the shared image, on the display.

5. The information processing apparatus according to claim 1, wherein the circuitry switches the display mode of the shared image on the display from a primary display mode, in which the shared image is displayed at the first display area set by a web browser operating on an operating system, to a secondary display mode, in which the shared image is displayed at a location-changeable display area set by the operating system.

6. The information processing apparatus according to claim 5, wherein after the circuitry switches the display mode of the shared image on the display from the primary display mode to the secondary display mode, in response to receiving an operation to change the display style of the second display area, the circuitry returns the display mode of the shared image on the display from the secondary display mode to the primary display mode.

7. The information processing apparatus according to claim 6, wherein in response to receiving an operation of reducing a size of the second display area, the circuitry returns the display mode of the shared image on the display from the secondary display mode to the primary display mode.

8. The information processing apparatus according to claim 1, wherein in response to receiving the user input to the second display area, the circuitry switches a display position of the shared image to another display position on the display.

9. An information processing system comprising:

the information processing apparatus of claim 1 provided with a plurality of numbers to configure the information processing system.

10. The information processing apparatus according to claim 1, wherein the display is further configured to display, in the second display area, a capture image obtained by capturing the shared image displayed in the first display area.

11. The information processing apparatus according to claim 1, wherein the predetermined size range is between a first size and a second size that is larger than the first size, wherein the size of the first display area is enlargeable and reduceable by an operation between the first size and the second size without changing the display mode to display the shared image as a floating window, and wherein, upon an operation of reducing the size of the first display area to less than the first size, the circuitry is configured to change the display mode to display the shared image as a floating window.

12. A non-transitory computer readable storage medium storing one or more instructions that, when performed by one or more processors, causes the one or more processors to execute a method of processing information, comprising:

displaying, on a display, a first display area used for displaying an image shared with a plurality of devices participating in a conference as a shared image, and a second display area used for receiving a user input; and switching a display mode of the shared image based on a user operation of changing a display style of the second display area, wherein a size of the first display area is enlargeable and reduceable by an operation in a predetermined size range without changing the display mode to display the shared image as a floating window, and wherein, upon an operation of reducing the size of the first display area to less than the predetermined size range, the display mode is changed to display the shared image as a floating window;

wherein the size of the first display area is enlargeable and reduceable by an operation in another size range without changing from the display mode of displaying the shared image as the floating window to a normal mode for displaying the shared image, and wherein, upon an operation of enlarging the size of the first display area to greater than said another size range, the display mode is changed to the normal mode for displaying the shared image.

* * * * *